(12) United States Patent
Sterman et al.

(10) Patent No.: US 11,214,024 B2
(45) Date of Patent: Jan. 4, 2022

(54) METHOD FOR FORMING THREE-DIMENSIONAL STRUCTURES WITH DIFFERENT MATERIAL PORTIONS

(71) Applicant: NIKE, Inc., Beaverton, OR (US)

(72) Inventors: Yoav Sterman, Portland, OR (US); Todd A. Waatti, Battle Ground, WA (US)

(73) Assignee: NIKE, Inc., Beaverton, OR (US)

( * ) Notice: Subject to any disclaimer, the term of this patent is extended or adjusted under 35 U.S.C. 154(b) by 277 days.

(21) Appl. No.: 16/375,804

(22) Filed: Apr. 4, 2019

(65) Prior Publication Data

US 2019/0232591 A1  Aug. 1, 2019

Related U.S. Application Data

(62) Division of application No. 15/590,966, filed on May 9, 2017, now Pat. No. 10,272,629, which is a division (Continued)

(51) Int. Cl.
| | |
|---|---|
| *B29C 70/74* | (2006.01) |
| *B29D 35/12* | (2010.01) |
| *B29C 48/152* | (2019.01) |
| *B29C 37/00* | (2006.01) |
| *B29C 64/386* | (2017.01) |
| *B29C 64/118* | (2017.01) |

(Continued)

(52) U.S. Cl.
CPC ........ *B29C 70/745* (2013.01); *B29C 37/0078* (2013.01); *B29C 37/0085* (2013.01); *B29C 48/152* (2019.02); *B29C 64/10* (2017.08); *B29C 64/118* (2017.08); *B29C 64/386*
(2017.08); *B29D 35/12* (2013.01); *B33Y 10/00* (2014.12); *B33Y 50/02* (2014.12); *B33Y 80/00* (2014.12); *B29K 2021/00* (2013.01); *B29L 2031/50* (2013.01)

(58) Field of Classification Search
None
See application file for complete search history.

(56) References Cited

U.S. PATENT DOCUMENTS

| | | |
|---|---|---|
| 3,591,996 A | 7/1971 | Shanok et al. |
| 3,719,965 A | 3/1973 | Chevallereau |
| | (Continued) | |

FOREIGN PATENT DOCUMENTS

| | | |
|---|---|---|
| CN | 1047797 A | 12/1990 |
| CN | 2185993 Y | 12/1994 |
| | (Continued) | |

OTHER PUBLICATIONS

"Creating Unique Lithophanes in a 3D Printer," www.3ers.org, Nov. 12, 2012, pp. 1-12. <http://www.3ders.org/articles/20121112-creating-unique-lithophanes-on-a-3d-printer.html.
(Continued)

*Primary Examiner* — Edmund H Lee
(74) *Attorney, Agent, or Firm* — Klarquist Sparkman, LLP

(57) ABSTRACT

A system and method for forming 3D printed structures includes printing an outer shell portion and filling an interior of the outer shell portion to form an inner portion. The outer shell portion and inner portion may have differing material properties. The outer shell portion may be anchored to the base component.

10 Claims, 22 Drawing Sheets

Related U.S. Application Data of application No. 14/273,675, filed on May 9, 2014, now Pat. No. 9,676,159.

(51) Int. Cl.
*B29C 64/10* (2017.01)
*B33Y 10/00* (2015.01)
*B33Y 50/02* (2015.01)
*B33Y 80/00* (2015.01)
B29K 21/00 (2006.01)
B29L 31/50 (2006.01)

(56) References Cited

U.S. PATENT DOCUMENTS

| | | | |
|---|---|---|---|
| 4,375,728 A | 3/1983 | Dassler | |
| 4,749,347 A | 6/1988 | Valavaara | |
| 5,121,329 A * | 6/1992 | Crump | B33Y 40/00 700/119 |
| 5,134,569 A | 7/1992 | Masters | |
| 5,180,534 A | 1/1993 | Thomas et al. | |
| 5,257,657 A * | 11/1993 | Gore | B22D 23/00 164/46 |
| 5,824,260 A | 10/1998 | Sauerhoefer | |
| 5,866,058 A | 2/1999 | Batchelder et al. | |
| 5,909,765 A | 6/1999 | McDowell | |
| 5,975,493 A | 11/1999 | Ellingson et al. | |
| 6,113,696 A | 9/2000 | Tseng | |
| 6,217,693 B1 | 4/2001 | Pelham | |
| 6,221,302 B1 | 4/2001 | Arai | |
| 6,226,896 B1 | 5/2001 | Friton | |
| 6,266,897 B1 | 7/2001 | Seydel et al. | |
| 6,280,785 B1 | 8/2001 | Yang et al. | |
| 6,505,089 B1 | 1/2003 | Yang et al. | |
| 6,658,314 B1 | 12/2003 | Gothait | |
| 6,708,378 B2 | 3/2004 | Parellada et al. | |
| 6,722,872 B1 | 4/2004 | Swanson et al. | |
| 6,814,907 B1 | 11/2004 | Comb | |
| 6,998,089 B2 | 2/2006 | Osaki | |
| 7,625,198 B2 | 12/2009 | Lipson et al. | |
| 7,658,464 B2 | 2/2010 | Silverbrook | |
| 7,926,204 B2 | 4/2011 | Ungari et al. | |
| 7,939,003 B2 | 5/2011 | Bonassar et al. | |
| 7,997,886 B2 * | 8/2011 | Kuo | B29C 44/18 425/174.4 |
| 8,178,033 B2 | 5/2012 | Dietrich et al. | |
| 8,469,692 B2 | 6/2013 | Kritchman et al. | |
| 8,568,121 B2 | 10/2013 | Khoshnevis | |
| 8,897,458 B2 | 11/2014 | Parkins et al. | |
| 10,391,705 B2 * | 8/2019 | Sterman | B33Y 40/00 |
| 2005/0023710 A1 | 2/2005 | Brodkin et al. | |
| 2006/0156978 A1 | 7/2006 | Lipson et al. | |
| 2006/0160250 A1 | 7/2006 | Bonassar et al. | |
| 2009/0014907 A1 | 1/2009 | Kuo | |
| 2010/0327479 A1 | 12/2010 | Zinniel et al. | |
| 2011/0169193 A1 | 7/2011 | Bonassar et al. | |
| 2012/0117822 A1 | 5/2012 | Jarvis | |
| 2012/0165969 A1 | 6/2012 | Elsey | |
| 2012/0222332 A1 | 9/2012 | Greene et al. | |
| 2012/0243701 A1 | 9/2012 | Parkins et al. | |
| 2013/0015596 A1 | 1/2013 | Mozeika et al. | |
| 2014/0020191 A1 | 1/2014 | Jones et al. | |
| 2014/0020192 A1 | 1/2014 | Jones et al. | |
| 2014/0093392 A1 | 4/2014 | Tibbott et al. | |
| 2014/0310891 A1 | 10/2014 | Miller et al. | |
| 2015/0099087 A1 | 4/2015 | Reznar et al. | |

FOREIGN PATENT DOCUMENTS

| | | |
|---|---|---|
| CN | 101044627 A | 9/2007 |
| CN | 103380156 A | 10/2013 |
| CN | 103717378 A | 4/2014 |
| EP | 0426363 | 5/1991 |
| EP | 0666163 | 8/1995 |
| EP | 1 346 816 A2 | 9/2003 |
| EP | 2189272 | 5/2010 |
| IT | 1164297 B | 4/1987 |
| WO | WO 2008/146141 A2 | 12/2008 |
| WO | WO 2014/014977 | 1/2014 |
| WO | WO 2014/028826 | 2/2014 |

OTHER PUBLICATIONS

International Search Report and Written Opinion, dated Jul. 10, 2015, for corresponding International Patent Application No. PCT/US2015/027067.

International Search Report and Written Opinion, dated Sep. 11, 2015, for corresponding International Patent Application No. PCT/US2015/027898.

Office Action, dated Mar. 6, 2018, from related Chinese Patent Application No. 201580029781.X, 9 pages.

* cited by examiner

METHOD FOR FORMING THREE-DIMENSIONAL STRUCTURES WITH DIFFERENT MATERIAL PORTIONS

CROSS REFERENCE TO RELATED APPLICATIONS

This application is a divisional of U.S. patent application Ser. No. 15/590,966, filed May 9, 2017, now U.S. Pat. No. 10,272,629, which is a divisional of U.S. patent application Ser. No. 14/273,675, filed May 9, 2014, now U.S. Pat. No. 9,676,159. The prior applications are incorporated herein by reference in their entirety.

BACKGROUND

The present embodiments relate generally to three-dimensional printing systems and methods.

Three-dimensional printing systems and methods may be associated with various technologies including fused deposition modeling (FDM), electron beam freeform fabrication (EBF), selective laser sintering (SLS) as well as other kinds of three-dimensional printing technologies.

Structures formed from three-dimensional printing systems can be used with objects formed by other manufacturing techniques. These include textile materials used in various articles of footwear and/or articles of apparel.

SUMMARY

In one aspect, a method of manufacturing a structure for permanent attachment to a base component includes associating a first nozzle with the base component, the first nozzle having a first aperture size. The method further includes forming an outer shell portion of the structure on the base component by extruding a first material through the first nozzle, where the outer shell portion is formed with at least one opening providing access to an interior of the outer shell portion. The method also includes removing the first nozzle from an area near the outer shell portion. The method also includes associating a second nozzle having a second aperture size with the at least one opening, where the second aperture size is greater than the first aperture size. The method also includes extruding a second material through the second nozzle and into the at least one opening in order to form an inner portion of the structure.

In another aspect, a method of manufacturing a structure for permanent attachment to a base component includes forming an outer shell portion of the structure on a surface of the base component by printing a first material onto the base component using a nozzle, where the outer shell portion is formed with at least one opening and where the outer shell portion is bonded to the base component. The method also includes filling an interior of the outer shell portion by extruding a second material through the nozzle and into the at least one opening in order to form an inner portion of the structure.

In another aspect, a method of manufacturing a structure for permanent attachment to a base component includes aligning a first nozzle with an opening in the base component, the nozzle being located adjacent to a first side of the base component. The method further includes extruding a first material through the opening and into a molding component on a second side of the base component in order to form an anchored portion on the second side. The method also includes extruding the first material from the first nozzle on the first side to form an outer shell portion of the structure, where the outer shell portion is integrally formed with the anchored portion and where the outer shell portion includes an upper opening. The method further includes filling an interior of the outer shell portion by extruding a second material through a second nozzle and into the upper opening of the outer shell portion in order to form an inner portion of the structure.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
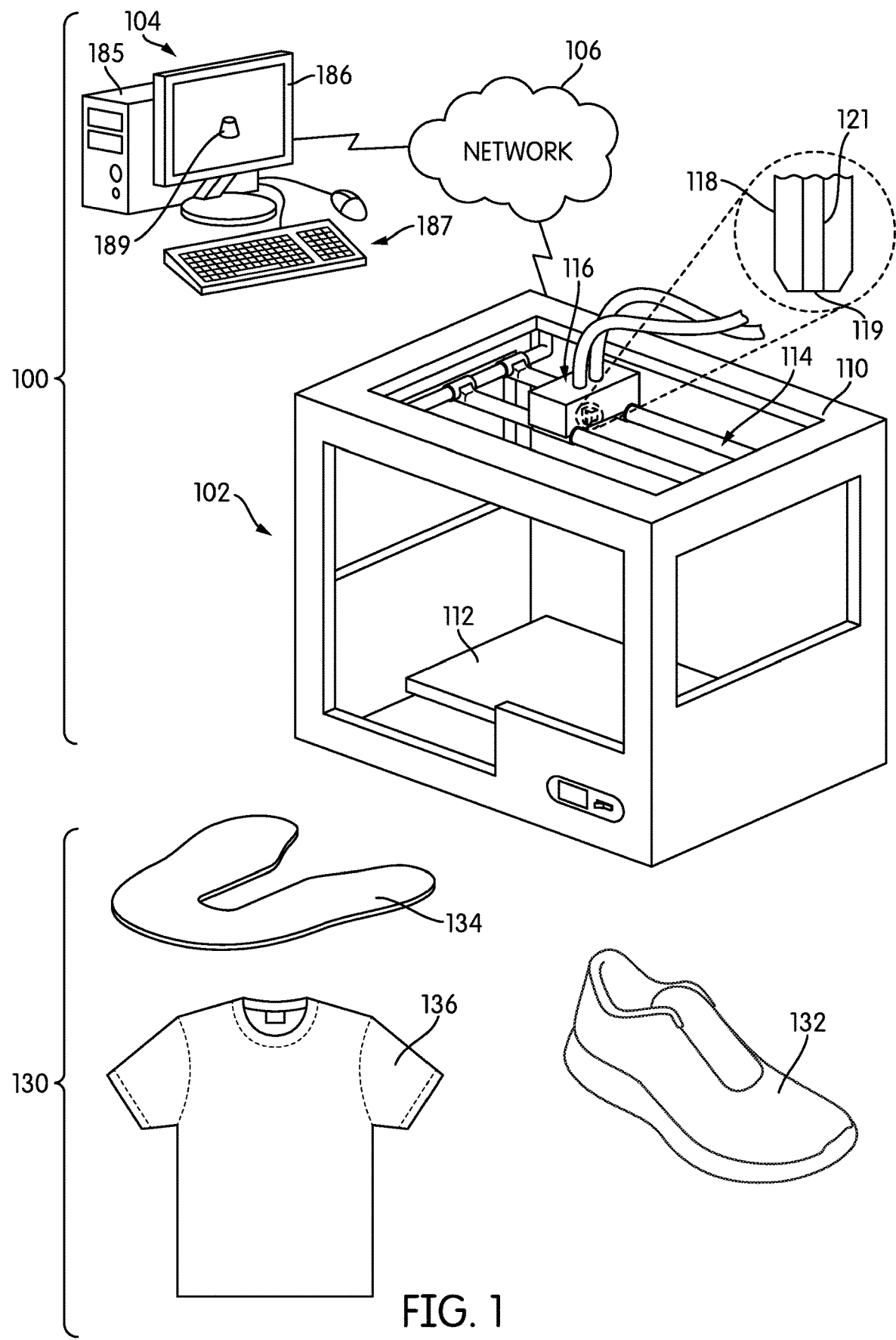
FIG. 1 is a schematic view of an embodiment of components of a three-dimensional printing system as well as several articles that may be used with the three-dimensional printing system.

FIG. 1 is a schematic view of an embodiment of a three-dimensional printing system 100, also referred to simply as printing system 100 hereafter. FIG. 1 also illustrates several exemplary articles 130 that may be used with printing system 100. Referring to FIG. 1, printing system 100 may further comprise printing device 102, computing system 104 and network 106.

Embodiments may use various kinds of three-dimensional printing (or additive manufacturing) techniques. Three-dimensional printing, or "3D printing", comprises various technologies that are used to form three-dimensional objects by depositing successive layers of material on top of one another. Exemplary 3D printing technologies that could be used include, but are not limited to: fused filament fabrication (FFF), electron beam freeform fabrication (EBF), direct metal laser sintering (DMLS), electron beam melting (EMB), selective laser melting (SLM), selective heat sintering (SHS), selective laser sintering (SLS), plaster-based 3D printing (PP), laminated object manufacturing (LOM), stereolithography (SLA), digital light processing (DLP) as well as various other kinds of 3D printing or additive manufacturing technologies known in the art.

In the embodiments shown in the figures, printing system 100 may be associated with fused filament fabrication (FFF), also referred to as fused deposition modeling. In the embodiment shown in FIG. 1, printing device 102 of printing system 100 uses fused filament fabrication to produce three-dimensional parts. An example of a printing device using fused filament fabrication (FFF) is disclosed in Crump, U.S. Pat. No. 5,121,329, filed Oct. 30, 1989 and titled "Apparatus and Method for Creating Three-Dimensional Objects," which application is herein incorporated by reference and referred to hereafter as the "3D Objects" application. Embodiments of the present disclosure can make use of any of the systems, components, devices and methods disclosed in the 3D Objects application.

Printing device 102 may include a housing 110 that supports various systems, devices, components or other provisions that facilitate the three-dimensional printing of objects (e.g., parts, components, structures). Although the exemplary embodiment depicts a particular rectangular box-like geometry for housing 110, other embodiments could use any housing having any geometry and/or design. The shape and size of the housing of a printing device could be varied according to factors including a desired foot-print for the device, the size and shape of parts that may be formed within the printing device as well as possibly other factors. It will be understood that the housing of a printing device could be open (e.g., provide a frame with large openings) or closed (e.g., with glass or panels of solid material and a door).

In some embodiments, printing device 102 may include provisions to retain or hold a printed object (or a component supporting the printed object). In some embodiments, printing device 102 may include a table, platform, tray or similar component to support, retain and/or hold a printed object or an object onto which printed material is being applied. In the embodiment of FIG. 1, printing device 102 includes tray 112. In some embodiments, tray 112 may be fixed in place. In other embodiments, however, tray 112 could move. For example, in some cases, tray 112 may be configured to translate within housing 110 in a horizontal direction (e.g., front-back and/or left right with respect to housing 110) as well as a vertical direction (e.g., up-down within housing 110). Moreover, in some cases, tray 112 may be configured to rotate and/or tilt about one or more axes associated with tray 112. Thus it is contemplated that in at least some embodiments, tray 112 may be moved into any desired relative configuration with a nozzle or print head of printing device 102.

In some embodiments, printing device 102 may include one or more systems, devices, assemblies or components for delivering a printed material (or printed substance) to a target location. As used herein, the terms "target location", "target portion" or "target surface" refer to any intended location, portion or surface where a printed material may be applied. Target locations could include the surface of tray 112, a surface or portion of a partially printed structure and/or a surface or portion of a non-printed structure or component. Provisions for delivering printed materials include, for example, print heads and nozzles. In the embodiment of FIG. 1, printing device 102 includes nozzle assembly 116.

Nozzle assembly 116 may comprise one or more nozzles that deliver a printed material to a target location. For purposes of clarity, the exemplary embodiment of FIG. 1 depicts a single nozzle 118 of nozzle assembly 116. However, in other embodiments, nozzle assembly 116 could be configured with any number of nozzles, which could be arranged in an array or any particular configuration. In embodiments comprising two or more nozzles, the nozzles could be configured to move together and/or independently. For example, in an embodiment of a printing system discussed below, a printing device could be configured with at least two nozzles that can move in an independent manner from one another.

Nozzle 118 may be configured with a nozzle aperture 119 that can be opened and/or closed to control the flow of material exiting from nozzle 118. Specifically, the nozzle aperture 119 may be in fluid communication with a nozzle channel 121 that receives a supply of material from a material source (not shown) within printing device 102. In at least some embodiments, a filament of material (e.g., plastic or wire) is provided as a coil, which may then be unwound and fed through nozzle 118 to be deposited at a target location. In some embodiments, a worm-drive may be used to push the filament into nozzle 118 at a specific rate (which may be varied to achieve a desired volumetric flow rate of material from nozzle 118). It will be understood that in some cases, the supply of material could be provided at a location near nozzle 118 (e.g., in a portion of nozzle assembly 116), while in other embodiments the supply of material could be located at some other location of printing device 102 and fed via tubes, conduits, or other provisions, to nozzle assembly 116.

In some embodiments, nozzle assembly 116 is associated with an actuating system 114. Actuating system 114 may include various components, devices and systems that facilitate the motion of nozzle assembly 116 within housing 110. In particular, actuating system 114 may include provisions to move nozzle assembly 116 in any horizontal direction and/or vertical direction to facilitate depositing a material so as to form a three-dimensional object. To this end, embodiments of actuating system 114 may include one or more tracks, rails, and/or similar provisions to hold nozzle assembly 116 at various positions and/or orientations within housing 110. Embodiments may also include any kinds of motors, such as a stepper motor or a servo motor, to move nozzle assembly 116 along a track or rail, and/or to move one or more tracks or rails relative to one another. In at least some embodiments, actuating system 114 may provide movement for nozzle assembly 116 in any of the x-y-z directions defined with respect to printing system 102 (e.g., Cartesian directions).

It will be understood that for purposes of illustration, the components, devices and systems of printing device 102 are shown schematically in FIG. 1. It will therefore be appreciated that embodiments may include additional provisions not shown, including specific parts, components and devices that facilitate the operation of actuating system 114 and nozzle assembly 116. For example, actuating system 114 is shown schematically as including several tracks or rails, but the particular configuration and number of parts comprising actuating system 114 may vary from one embodiment to another.

In different embodiments, printing device 102 may use a variety of different materials for forming 3D parts, including, but not limited to: thermoplastics (e.g, polyactic acid and acrylonitrile butadiene styrene), high density polyethylene, eutectic metals, rubber, clays (including metal clays), Room Temperature Vulcanizing silicone (RTV silicone), porcelain, as well as possibly other kinds of materials known in the art. In embodiments where two or more different printed or extruded materials are used to form a part, any two or more of the materials disclosed above could be used.

As discussed above, printing system 100 can include provisions to control and/or receive information from printing device 102. These provisions can include a computing system 104 and a network 106. Generally, the term "computing system" refers to the computing resources of a single computer, a portion of the computing resources of a single computer, and/or two or more computers in communication with one another. Any of these resources can be operated by one or more human users. In some embodiments, computing system 104 may include one or more servers. In some cases, a print server may be primarily responsible for controlling and/or communicating with printing device 102, while a separate computer (e.g., desktop, laptop or tablet) may facilitate interactions with a user. Computing system 104 can also include one or more storage devices including but not limited to magnetic, optical, magneto-optical, and/or memory, including volatile memory and non-volatile memory.

In the exemplary embodiment of FIG. 1, computing system 104 may comprise a central processing device 185, viewing interface 186 (e.g., a monitor or screen), input devices 187 (e.g., keyboard and mouse), and software for designing a computer-aided design ("CAD") representation 189 of a printed structure. In at least some embodiments, the CAD representation 189 of a printed structure may include not only information about the geometry of the structure, but also information related to the materials required to print various portions of the structure.

In some embodiments, computing system 104 may be in direct contact with printing device 102 via network 106. Network 106 may include any wired or wireless provisions that facilitate the exchange of information between computing system 104 and printing device 102. In some embodiments, network 106 may further include various components such as network interface controllers, repeaters, hubs, bridges, switches, routers, modems and firewalls. In some cases, network 106 may be a wireless network that facilitates wireless communication between two or more systems, devices and/or components of printing system 100. Examples of wireless networks include, but are not limited to: wireless personal area networks (including, for example, Bluetooth), wireless local area networks (including networks utilizing the IEEE 802.11 WLAN standards), wireless mesh networks, mobile device networks as well as other kinds of wireless networks. In other cases, network 106 could be a wired network including networks whose signals are facilitated by twister pair wires, coaxial cables, and optical fibers. In still other cases, a combination of wired and wireless networks and/or connections could be used.

In some embodiments, printed structures may be printed directly to one or more articles. The term "articles" is intended to include both articles of footwear (e.g., shoes) and articles of apparel (e.g., shirts, pants, etc.). As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots, for example. As used throughout this disclosure, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of footwear, the disclosed embodiments may further be equally applied to any article of clothing, apparel, or equipment that includes 3D printing. For example, the disclosed embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used throughout this disclosure, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, etc. As used throughout this disclosure, the terms "article of apparel," "apparel," "article of footwear," and "footwear" may also refer to a textile, a natural fabric, a synthetic fabric, a knit, a woven material, a nonwoven material, a mesh, a leather, a synthetic leather, a polymer, a rubber, and a foam.

In an exemplary embodiment, printing device 102 may be configured to print one or more structures directly onto a portion of one of articles 130. Articles 130 comprise exemplary articles that may receive a printed structure directly from printing device 102, including an article of footwear 132, which has a three-dimensional configuration, as well as an upper 134, which has a flattened configuration. Articles 130 also include t-shirt 136. Thus it will be understood that printing device 102 may be used to apply printed material to articles in three-dimensional configurations and/or flattened configurations.

In order to apply printed materials directly to one or more articles, printing device 102 may be capable of printing onto the surfaces of various kinds of materials. Specifically, in some cases, printing device 102 may be capable of printing onto the surfaces of various materials such as a textile, a natural fabric, a synthetic fabric, a knit, a woven material, a nonwoven material, a mesh, a leather, a synthetic leather, a polymer, a rubber, and a foam, or any combination of them, without the need for a release layer interposed between a substrate and the bottom of the printed material, and without the need for a perfectly or near-perfectly flat substrate surface on which to print. For example, the disclosed methods may include printing a resin, acrylic, thermoplastic material or ink material onto a fabric, for example a knit material, where the material is adhered/bonded to the fabric and where the material does not generally delaminate when flexed, rolled, worked, or subject to additional assembly processes/steps. As used throughout this disclosure, the term "fabric" may be used to refer generally to materials chosen from any textile, natural fabric, synthetic fabric, knit, woven material, nonwoven material, mesh, leather, synthetic leather, polymers, rubbers, and foam.

Although some embodiments may use printing device 102 to print structures directly onto the surface of a material, other embodiments may include steps of printing a structure onto a tray or release paper, and then joining the printed structure to an article in a separate step. In other words, in at least some embodiments, printed structures need not be printed directly to the surface of an article.

Printing system 100 may be operated as follows to provide one or more structures that have been formed using a 3D printing, or additive, process. Computing system 104 may be used to design a structure. This may be accomplished using some type of CAD software, or other kind of software. The design may then be transformed into information that can be interpreted by printing device 102 (or a related print server in communication with printing device 102). In some cases, the design may be converted to a 3D printable file, such as a stereolithography file (STL file).

Before printing, an article may be placed onto tray 112. Once the printing process is initiated (by a user, for example), printing device 102 may begin depositing material onto the article. This may be accomplished by moving nozzle 118 (using actuating device 114) to build up layers of a structure using deposited material. In embodiments where fused filament fabrication is used, material extruded from nozzle 118 may be heated so as to increase the pliability of the material as it is deposited.

Although some of the embodiments shown in the figures depict a system using filament fused fabrication printing technologies, it will be understood that still other embodiments could incorporate one or more different 3D printing technologies. Moreover, still other embodiments could incorporate a combination of filament fused fabrication and another type of 3D printing technique to achieve desired results for a particular printed structure or part.

Figure 2:
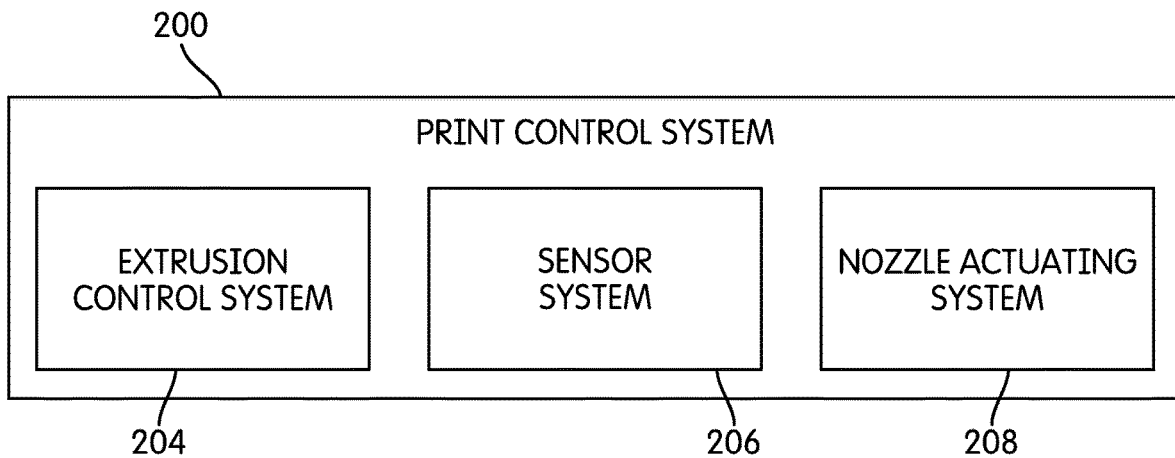
FIG. 2 is a schematic diagram of an embodiment of various sub-systems associated with a three-dimensional printing system.

FIG. 2 illustrates a schematic embodiment of a print control system 200. Referring to FIG. 2, print control system 200 includes an extrusion control system 204, a sensor system 206 and a nozzle actuating system 208. Each of these systems, discussed in further detail below, may operate in cooperation with one another to facilitate the printing of a structure. Specifically, nozzle actuating system 208 controls the movement of nozzle 118, while extrusion control system 204 controls the flow and properties of material deposited as nozzle 118 is moved around. Additionally, sensor system 206 includes provisions to provide feedback to both nozzle actuating system 208 and extrusion control system 204 in real-time, so that printing can be adjusted in real-time to achieve precise geometries and material characteristics for printed structures.

Nozzle actuating system 208 allows for the motion of nozzle 118 in any direction, including both horizontal and vertical directions within housing 110. In at least some embodiments, nozzle actuating system 208 facilitates the motion of nozzle 118 along a tool path that is determined from the CAD design of the printed structure.

Figure 3:
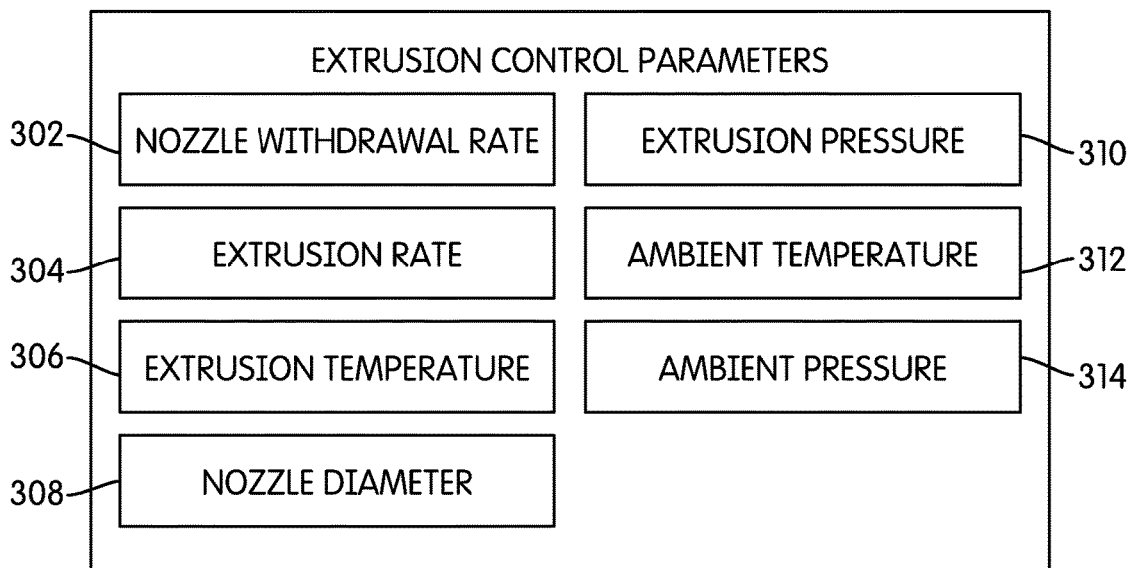
FIG. 3 is a schematic diagram of an embodiment of a set of extrusion control parameters.

Extrusion control system 204 may include one or more provisions for controlling the flow of material from nozzle 118 (or any other nozzles associated with nozzle assembly 116) as well as the behavior of the material after it has been deposited onto a target location. As shown schematically in FIG. 3, extrusion control system 204 can be associated with one or more "extrusion control parameters" that can be varied to change the flow rate of, and/or other properties of, the extruded material. For example, extrusion control parameters can include a nozzle withdrawal rate 302, an extrusion rate 304, an extrusion temperature 306, a nozzle diameter 308, an extrusion pressure 310, an ambient temperature 312 and an ambient pressure 314. It will be understood that these parameters are only intended to be exemplary and other embodiments could include additional extrusion control parameters. Also, in at least some embodiments, some of these extrusion control parameters may be optional. In other words, in some other embodiments, one or more of these parameters may be either fixed or not adjustable.

Nozzle withdrawal rate 302 may characterize the rate at which nozzle 118 is moved away from (or raised) an underlying surface where extruded material is being deposited. Because newly extruded material is forced from nozzle 118 under pressure, changing the rate at which nozzle 118 is pulled away from the target location may tend to affect how the extruded material spreads on the target location. Extrusion rate 304 may characterize the rate at which material is flowing through aperture 121 of nozzle 118. As used herein, the term "extrusion rate", also referred to as the "flow rate", refers to the volumetric flow rate at which material is extruded from (or flows from) the nozzle. Increasing the extrusion rate may tend to create a larger volume of material deposited at a given location over an interval of time, while decreasing the extrusion rate may tend to decrease the volume of material deposited at a given location for the same interval of time.

Extrusion temperature 306 may characterize the temperature of the material as it is extruded from nozzle 118 and deposited at a target location. In at least some cases, varying the extrusion temperature may change the pliability of the material, which can affect spreading of the material at the target location. Also, the temperature of the extruded material may affect how quickly the material cools and/or cures, which can also affect spreading and the final geometry of a printed structure. Nozzle diameter 308 characterizes the size of aperture 121 and/or of channel 123 of nozzle 118. Varying these diameters can affect the total volume of material deposited at a target location over a given period of same.

Extrusion pressure 310 characterizes the force per unit area applied by a portion of extruded material against a portion of material at a target location. The extrusion pressure may affect the rate and degree of spreading. Also, ambient temperature 312 and ambient pressure 314 may characterize the ambient temperature and ambient pressure, respectively, of the area near nozzle 118. In at least some embodiments, material pliability and curing properties may vary significantly with differences in ambient temperature and/or ambient pressure.

Embodiments can include provisions for adjusting one or more of these extrusion control parameters. In some embodiments, for example, nozzle withdrawal rate 302 may be controlled using actuating system 114, which controls both the horizontal and vertical motions of nozzle 118. Additionally, some embodiments can include provisions to control a worm-drive or other mechanism that controls the extrusion rate 304 and/or extrusion pressure 310 at which material is extruded from nozzle 118. In some embodiments, the extrusion temperature 306 can be controlled with heating coils 405 (see FIG. 4) within nozzle 118. Additionally, nozzle diameter 308 may be controlled using methods known in the art. Finally, ambient temperature 312 and ambient pressure 314 may be controlled with various different provisions known in the art for controlling temperature and pressure within a confined space. Of course it will be understood that embodiments are not limited to these exemplary provisions for controlling one or more extrusion control parameters. Other embodiments could utilize any other systems, methods and/or devices to control these various parameters that may be known in the art.

It may be understood that the parameters discussed with respect to extrusion control system 204 are only intended to be examples of parameters that may be used to control how material is deposited at a target location such that the material behaves in the desired manner (e.g., spreads at a desired rate and cures at a desired rate). The types of parameters used may depend on manufacturing considerations as well as the specific design of the printing device. In an exemplary embodiment, printing device 102 may be designed to allow for the adjustment of at least one the extrusion control parameters discussed here. In other words, in an exemplary embodiment, printing device 102 is designed so that various extrusion control parameters may be adjusted in real-time using information provided as part of, or in coordination with, a 3D printing file for printing device 102.

Figure 4:
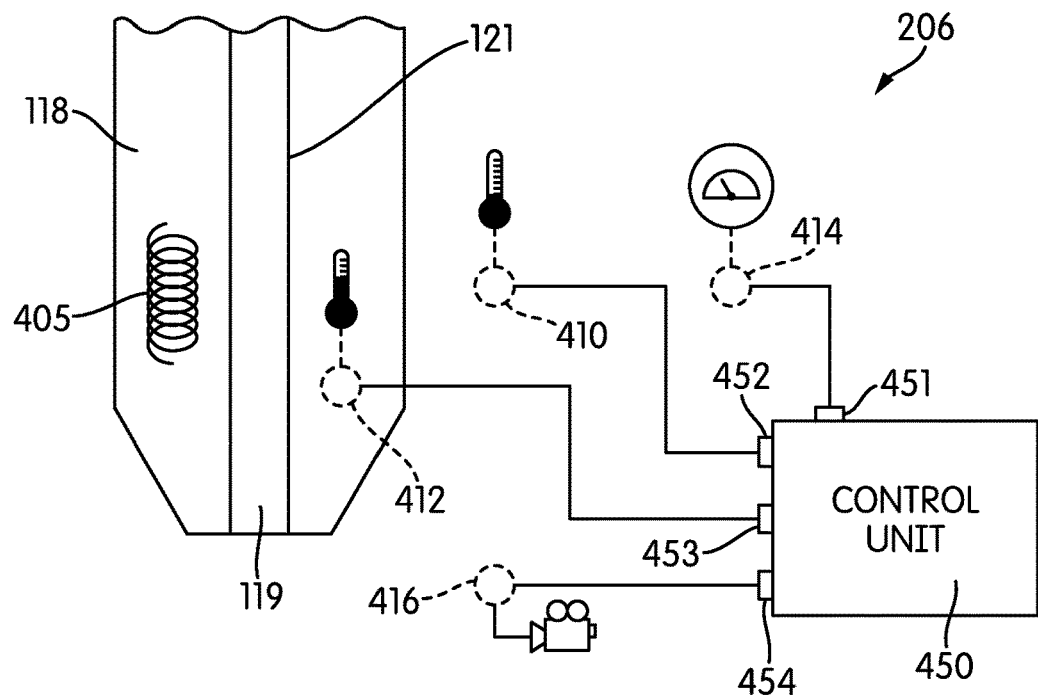
FIG. 4 is a schematic diagram of an embodiment of a nozzle of a three-dimensional printing system and optional sensors.

FIG. 4 illustrates a schematic configuration of various sensors that may comprise part of sensor system 206. Referring to FIG. 4, sensor system 206 may include an ambient temperature sensor 410 and a nozzle temperature sensor 412. In this exemplary configuration, ambient temperature sensor 410 may be located near, but not within or on, nozzle 118. It will be understood that ambient temperature sensor 410 could be any kind of sensor known in the art for detecting information related to ambient temperature. In the exemplary configuration shown in FIG. 4, nozzle temperature sensor 412 is disposed within nozzle 118. In some cases, nozzle temperature sensor 412 could be in direct contact with material flowing through channel 121 of nozzle 118. In other embodiments, however, nozzle temperature sensor 412 could be located in any other portion of nozzle 118, as well as possibly being mounted outside of nozzle 118. In at least some embodiments where the temperature of a flowing material is not directly measured, the temperature of one or more parts of nozzle 118 may be used as a proxy for the temperature of the material. It will be understood that nozzle temperature sensor 412 may generally be any kind of temperature sensor known in the art.

Embodiments may also include provisions for detecting ambient pressure. In some embodiments, sensor system 206 may include ambient pressure sensor 414. Generally, ambient pressure sensor 414 may be any kind of pressure sensing device known in the art.

Embodiments can include provisions for detecting optical information about a printed structure, including recently extruded material. In some embodiments, sensor system 206 includes an optical sensing device 416. Optical sensing device 416 may be any kind of device capable of capturing image information. Examples of different optical sensing devices that can be used include, but are not limited to: still-shot cameras, video cameras, digital cameras, non-digital cameras, web cameras (web cams), as well as other kinds of optical devices known in the art. The type of optical sensing device may be selected according to factors such as desired data transfer speeds, system memory allocation, desired temporal resolution for viewing a printed structure, desired spatial resolution for viewing a printed structure as well as possibly other factors. In at least one embodiment, optical sensing device could be an image sensor having a minimal form factor, for example an optical sensing device with a CMOS image sensor with a footprint on the order of several millimeters or less.

Exemplary image sensing technologies that could be used with optical sensing device 416 include, but are not limited to: semiconductor charge-coupled devices (CCD), complementary metal-oxide-semiconductor (CMOS) type sensors, N-type metal-oxide-semiconductor (NMOS) type sensors as well as possibly other kinds of sensors. The type of image sensing technology used may vary according to factors including optimizing the sensor type compatible with ambient conditions in printing device 102 (and near or within nozzle 118), size constraints as well as possibly other factors. In some other embodiments, optical sensing devices that detect non-visible wavelengths (including, for instance, infrared wavelengths) could also be used.

In different embodiments, the location of optical sensing device 416 could vary. In some embodiments, for example, optical sensing device 416 could be disposed near, or even attached to, nozzle 118. As nozzle 118 is moved, optical sensing device 416 may therefore travel with nozzle 118. In other embodiments, optical sensing device 416 could be disposed away from nozzle 118. In some cases, optical sensing device 416 could have a fixed location and/or orientation relative to housing 110. In other cases, optical sensing device 416 could have an adjustable location and/or orientation and could be movable independently of nozzle 118.

Optical sensing device 416 may convert optical images into information transmitted via electrical signals to one or more systems of printing system 100. Upon receiving these electrical signals, the one or more systems can use this information to determine a variety of information about objects that may be visible to optical sensing device 416.

Embodiments may include an electronic control unit 450, also referred to as ECU 450, for controlling and/or communicating with various sensors of sensor system 206. For purposes of clarity, only a single ECU is depicted in this embodiment. However, it will be understood that in other embodiments multiple ECU's could be used, each ECU communicating with some or all of the sensors. The ECU's may themselves be further associated with a particular system or device of printing system 100.

ECU 450 may include a microprocessor, RAM, ROM, and software all serving to monitor and control various components of sensor system 206, as well as other components or systems of printing system 100. For example, ECU 450 is capable of receiving signals from numerous sensors, devices, and systems associated with printing system 100. The output of various devices is sent to ECU 450 where the device signals may be stored in an electronic storage, such as RAM. Both current and electronically stored signals may be processed by a central processing unit (CPU) in accordance with software stored in an electronic memory, such as ROM.

ECU 450 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 450 are optional. Some embodiments may include a given port or provision, while others may exclude it. The following description discloses many of the possible ports and provisions that can be used, however, it should be kept in mind that not every port or provision must be used or included in a given embodiment.

As indicated in FIG. 4, ECU 450 includes port 451 for communicating with, and/or powering, ambient pressure sensor 414. ECU 450 also includes port 452 for communicating with, and/or powering, ambient temperature sensor 410; port 453 for communicating with, and/or powering, nozzle temperature sensor 412; and port 454 for communicating with, and/or powering, optical sensing device 416.

FIG. 4 also schematically indicates optional heating coils 405 associated with nozzle 118 that may be used to heat nozzle 118 and/or material flowing through nozzle 118. Heating coils 405 may be connected to ECU 450, or a similar control unit. Although the exemplary embodiment depicts heating coils disposed interior to nozzle 118, other embodiments could use heating coils at any other portion nozzle assembly 116, as well as possibly other portions of printing device 102 upstream of nozzle assembly 116. It will also be understood that heating coils are only one exemplary type of heating device that could be used. Other embodiments could utilize any other heating devices, systems or mechanisms known in the art for heating nozzles, valves, channels, tubes or other systems associated with the transfer of a flowing material.

Embodiments can include provisions to control the properties of a material that has been recently extruded or deposited from a nozzle. In at least some embodiments, printing device 102 may include one or more curing control devices. A curing control device may be any device that allows for the curing of the extruded material to be controlled, or adjusted, after the material has been extruded from a nozzle.

Figure 5:
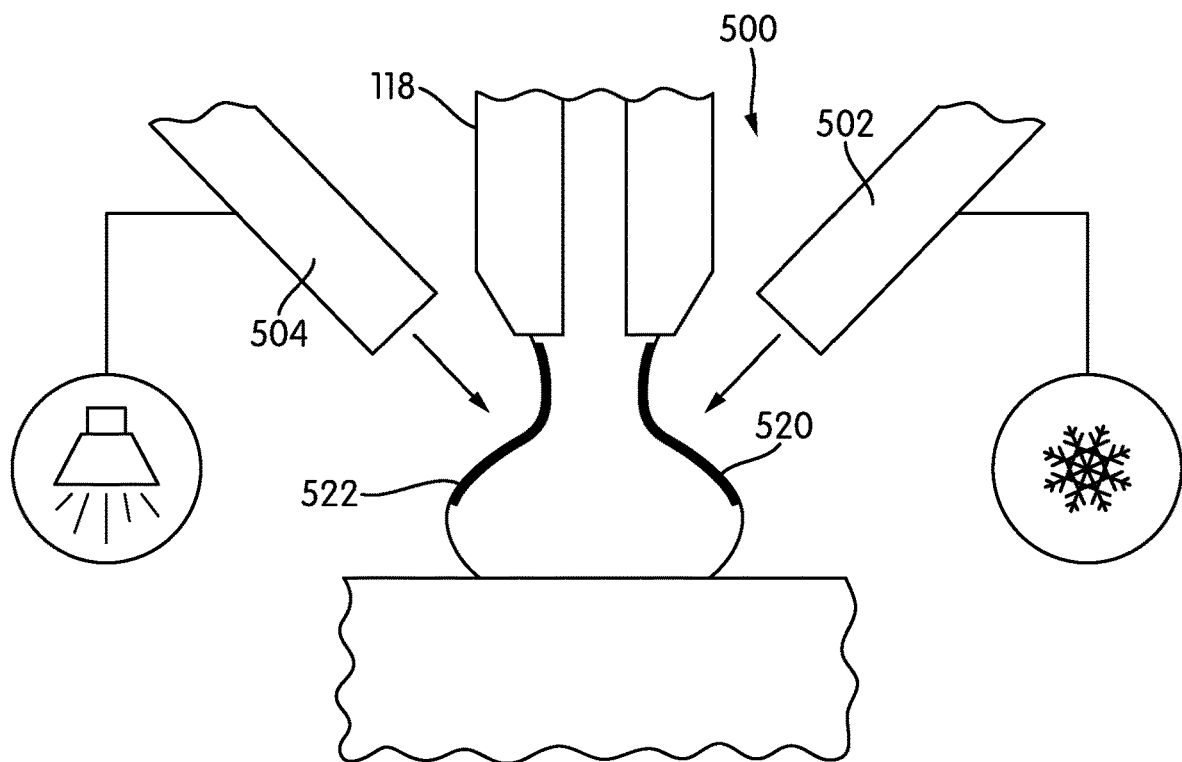
FIG. 5 is a schematic view of an embodiment of a nozzle and a device for modifying physical properties of a portion of material recently ejected from the nozzle.

FIG. 5 is a schematic view of an embodiment of two curing control devices 500. Curing control devices 500 includes a cooling device 502 and a UV lighting device 504. Cooling device 502 may be a device that applies cooled air (i.e., air well below ambient temperature) to a portion of extruded material 520. The application of cooled air may facilitate faster curing of the portion of extruded material 520. Likewise, UV lighting device 504 may be a device that applies ultraviolet radiation to a portion of extruded material 522. For materials that may be UV cured, the application of ultraviolet light may facilitate faster curing of the portion of extruded material 522. Although not shown, it is also contemplated that some embodiments could incorporate one or more heating devices that allow portions of extruded material to be heated above the temperature at which they are extruded, in order to temporarily increase pliability and flow, so that the material may more quickly spread over a target location.

Although a single device is shown for each kind of curing control device in the exemplary embodiment of FIG. 5, other embodiments could include two or more of each kind of curing control device. Moreover, some embodiments could include single devices that provide coverage (e.g., application of cooled air or UV radiation) through a wide range of angles surrounding the extruded portion of material. Such embodiments could apply cooled air and/or UV radiation to regions ranging from a few degrees to 360 degrees around the portion of extruded material.

It is contemplated that curing control devices could be applied locally or globally. For example, in FIG. 5, both curing control devices 500 are comprised of a relatively narrow probe-like device that applies cooled air and/or UV radiation to a local portion of extruded material. However, other embodiments could include larger devices that apply cooled air and/or UV radiation to a large portion, or even all portions of, extruded material. Still further, some embodiments may use curing control devices 500 to provide local curing to predetermined portions of a structure while the structure is printed, and may also use additional curing provisions to provide curing to the entire structure after the printing process has been completed. For example, in another embodiment, following the formation of a printed structure, the entire printed structure could be exposed to cool air and/or UV radiation for curing.

Embodiments that use highly local applications of cooled air and/or UV curing (or possibly heating), may help improve the precision of forming a three-dimensional structure. For example, applying cooled air to some thermoplastic materials may allow the extruded material to be cured very quickly, thereby allowing for improved precision in forming curved and/or overhanging structures in relatively short periods of time. Additionally, because the exemplary embodiments contemplate extruding relatively large volumes of material at a target location in a short period of time compared to some alternative methods, decreasing curing time of the material as it is extruded using curing control devices can help improve the overall quality of the printed structure.

Figure 6:
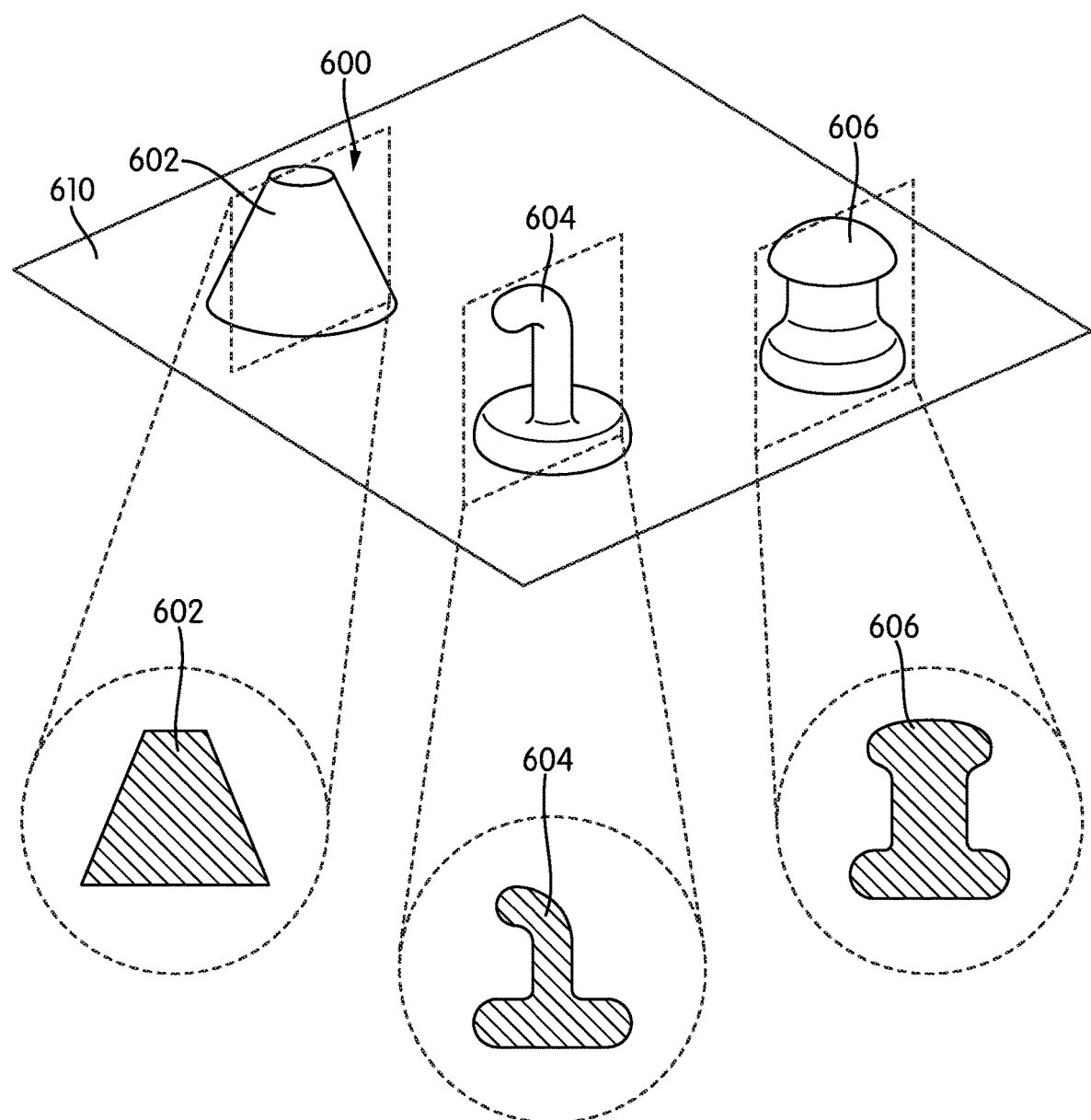
FIG. 6 is a schematic isometric view of an embodiment of several structures that may be formed with a three-dimensional printing system.

FIG. 6 is a schematic isometric view of an embodiment of several 3D printed structures 600, also referred to simply as structures throughout this detailed description and in the claims. Structures 600 include an exemplary cleat structure 602, hook structure 604 and knob-like structure 606. It will be understood that these structures are only intended to be examples of possible 3D printed structures that can be formed using the methods disclosed herein. Moreover, in at least some embodiments, these exemplary structures may be formed using an extrusion type of 3D printing process that can decrease total printing times over some other embodiments of 3D printing methods.

In the embodiment shown in FIG. 6, structures 600 are bonded to base component 610. Base component 610 is shown schematically for purposes of illustration, and could be considered to be a portion of various kinds of articles including both articles of footwear and articles of apparel in some embodiments. As used throughout this detailed description and in the claims, a "base component" may generally comprise any component that to which one or more printed structures have been applied. A base component could be a textile material (including woven textiles, knit textiles, braided textiles and non-woven textiles), a leather (natural or synthetic) a plastic (including a plastic film), rubber, a metal or any other kind of material. Furthermore, in some embodiments 3D printed structures could be printed directly onto the surface of a base component. In such embodiments, the one or more materials forming the 3D printed structure may be bond compatible with at least one material of the base component. In other embodiments, the one or more materials forming the 3D printing structure could be applied to the base component after printing, for example, using an adhesive or a mechanical connection.

FIGS. 7-14 illustrate schematic views of an embodiment of a process for forming 3D printed structure 606 (a knob-like structure) on base component 610. The formed structure 606 is shown specifically in FIG. 14. For purposes of description, several terms are defined herein to refer to material used in forming a 3D printed structure, including terms indicating various states or configurations of material throughout the forming process. The term "portion of material" is used herein to refer to any volume or part of an extruded material that may or may not be continuous with adjacent volumes or parts of extruded material. A portion of material may be located exterior to a nozzle (once the portion has been extruded or deposited) or may be located interior to the nozzle (or even upstream of the nozzle) prior to extrusion. Still further, a portion of material can be partially disposed within the nozzle and partially exterior to the nozzle. Once extruded and cured (e.g., hardened), portions of material may comprise portions of the final 3D printed structure.

As previously described, a material 700 is extruded through and from nozzle 118. The material exiting nozzle 118 may be characterized herein as being "extruded", "printed", "ejected" or "deposited". Material 700 could comprise any kind of printable and/or extrudable material. Different embodiments could use materials including, but not limited to: an ink, a resin, an acrylic, a polymer, a thermoplastic material, a thermosetting material, a light-curable material, or combinations thereof. Some embodiments could also utilize filler materials incorporated into an extruded or printed material. For example, a filler material incorporated into an extruded material may be a powdered material or dye designed to impart desired color or color patterns or transitions, metallic or plastic particles or shavings, or any other powdered mineral, metal, or plastic. In at least some embodiments, therefore, material 700 may thus be a composite material. In one embodiment, material 700 may be a thermoplastic material that may be heat cured (i.e., heated above its glass transition temperature for printing and then cooled to form a relatively rigid, or non-pliable, printed structure).

Figure 19:
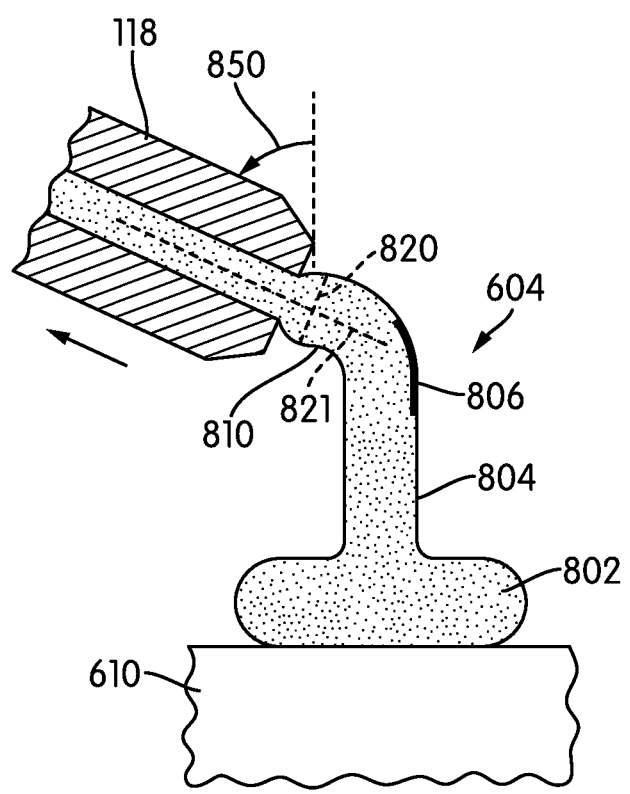

For purposes of consistency and convenience, a first direction 702 (shown schematically in FIG. 7) is defined relative to nozzle 118. First direction 702 is a direction extending along a central axis of nozzle 118 and defines an "extruding direction", i.e., a direction along which material is extruded from, or pushed from, nozzle 118. In embodiments where nozzle 118 is primarily kept in a fixed orientation and raised vertically away from base component 610, first direction 702 may remain approximately perpendicular with an outer surface 611 of base component 610, as depicted in the embodiment of FIGS. 7-14. However, in other embodiments where the orientation of nozzle 118 may change with respect to a base component, as shown in the embodiment of FIG. 19, first direction 702 may be characterized as remaining approximately parallel with a central axis of the formed 3D printed structure such that nozzle 118 is always extruding material onto the end, or most recently formed, portion of the structure.

A second direction 704 is characterized as a direction that is approximately perpendicular to first direction 702. Although shown in the embodiments as oriented in a particular widthwise direction, it should be understood that second direction 704 is representative of any direction perpendicular to first direction 702. For example, second direction 704 may be characterized as a radial direction with respect to first direction 702. In some cases, first direction 702 may be characterized as an axial direction. In embodiments where nozzle 118 is primarily kept in fixed orientation with respect to base component 610, as in the embodiment of FIGS. 7-14, second direction 702 may be approximately parallel with outer surface 611 of base component 610. However, in embodiments where the orientation of nozzle 118 may change relative to a base component, as shown in FIG. 19, second direction 704 may still be characterized as being perpendicular to first direction 702, and may generally be approximately parallel with a lateral or widthwise direction of a portion of a structure adjacent to nozzle 118.

The exemplary embodiment contemplates "extruding" (i.e., thrusting or pushing) portions of material through the nozzle, which may generate forces and pressures within the material initially directed along first direction 702. As portions of material exit nozzle 118, however, contact with base component 610 and/or portions of material already formed on base component 610 may result in a change of flow direction from being primarily along first direction 702, to being primarily along second direction 704. In other words, when pushed against either base component 610 or an adjacent portion of material, the recently extruded portions of material may tend to flow, or spread, outwardly along second direction 704. This flow may be alternatively characterized as "outward spreading" as it tends to occur in a direction that is radially outward from the initial stream of material extruded from nozzle 118 in first direction 702. In embodiments where a structure is formed with a longitudinal axis oriented in first direction 702, this outward spreading may be oriented along a lateral dimension (or widthwise) dimension of the 3D printed structure.

For purposes of characterizing the dimensions of portions of material oriented in second direction 704, the term "cross-sectional area" is used to refer to the cross-sectional area of a portion of material taken along second direction 704. In particular, the cross-sectional area is generally taken through a plane that is (like second direction 704) perpendicular to first direction 702. In at least some embodiments, the portions of material may spread uniformly outwardly in the second direction 704, so that the cross-sectional area is approximately circular. In such cases, the term "diameter" may also be used to characterize the dimensions of the portion of material oriented along second direction 704. In particular, any approximately circular cross-sectional area for a portion may have a unique corresponding diameter.

Figure 7:
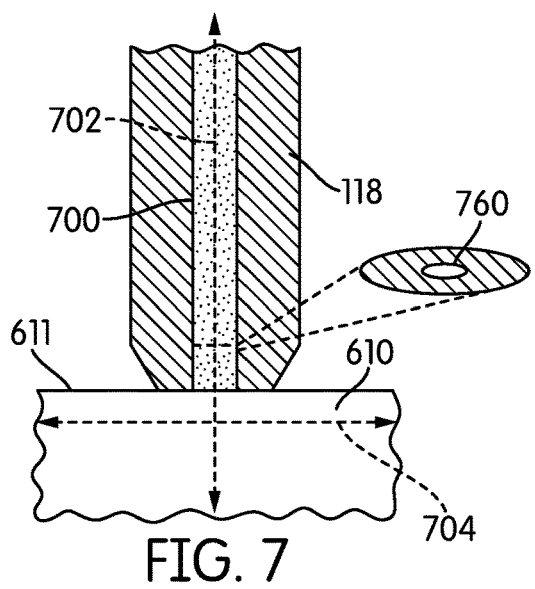
FIGS. 7-14 are schematic views of steps in forming a knob-like structure by extruding material from a nozzle, according to an embodiment.
Figure 8:
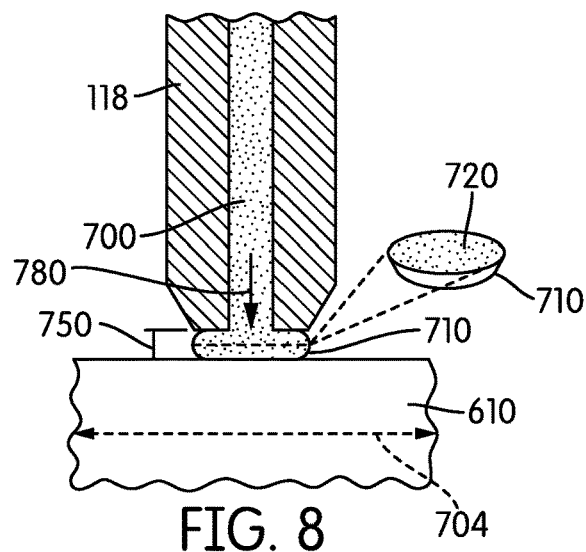
Figure 9:
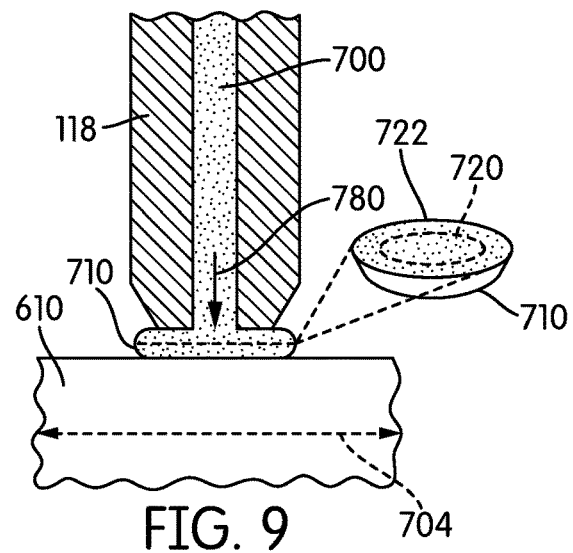

As shown in FIGS. 7-14, in the exemplary printing process, material 700 is extruded from nozzle 118 onto base component 610. In FIGS. 7 and 8, a first portion of material 710 is extruded directly onto outer surface 611 of base portion 610. As nozzle 118 is raised from a position in direct contact with base component 610 (FIG. 7) to a position disposed a distance 750 from base component 610 (FIG. 8), first portion of material 710 undergoes spreading in second direction 704. As material 700 is continually extruded from nozzle 118, first portion of material 710 expands from having a first cross-sectional area 720 (FIG. 8) to having a second cross-sectional area 722 (FIG. 9), which is larger than first cross-sectional area 720. In this case, since the approximate distance of nozzle 118 to base component 610 is unchanged between the configuration of FIG. 8 and the configuration of FIG. 9, first portion of material 710 retains an approximately constant height and the outward flow of material can be seen to be partially due to the constriction of first portion of material 710 between the end of nozzle 118 and base component 610.

Figure 10:
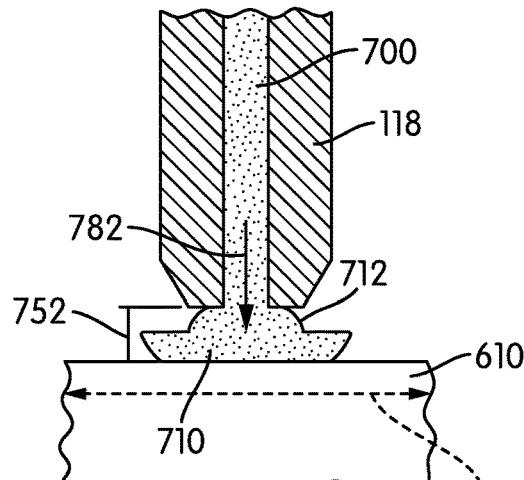

Moving next to the configuration shown in FIG. 10, first portion of material 710 may stop spreading in second direction 704 as first portion of material 710 is cured (by cooling below a predetermined temperature or another mechanism) and as nozzle 118 is raised to a position a second distance 752 from base component 610. Here, first portion of material 710 has formed a first portion of structure 606, as seen by comparing the geometry of first portion of material 710 in FIG. 14 with a corresponding first portion 740 of structure 606 shown in FIG. 10. As seen in FIG. 10, a second portion of material 712, generally continuous with first portion of material 710, is extruded from nozzle 118 onto first portion of material 710. Being pushed down against first portion of material 710, and partially constricted between nozzle 118 and first portion of material 710, second portion of material 712 spreads outwardly in second direction 704.

Figure 11:
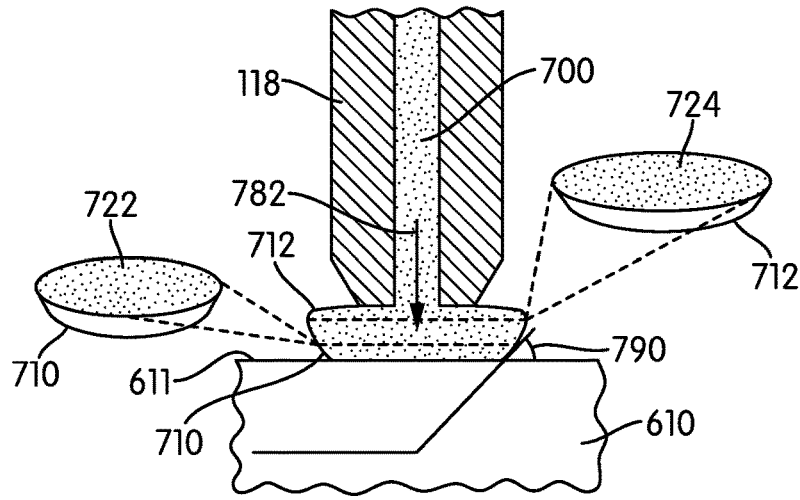
Figure 14:
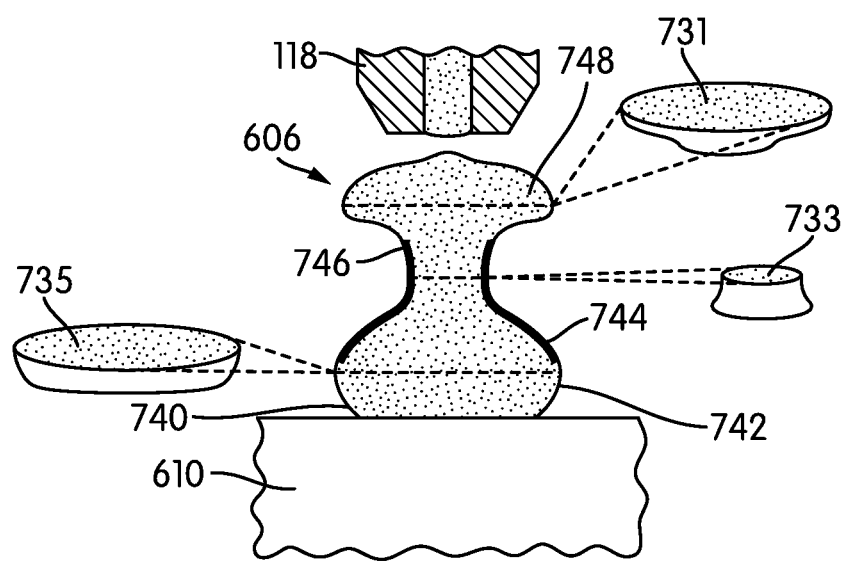

In the next configuration of the process shown in FIG. 11, second portion of material 712 has spread until second portion 742 of structure 606 has been formed, as seen by comparing FIGS. 11 and 14. Together, first portion 740 of structure 606 and second portion 742 of structure 606, formed by first portion of material 710 and second portion of material 712, respectively, comprise a bottom most portion of structure 606 with a generally increasing cross-sectional area (and diameter) from first portion 740 to second portion 742. Correspondingly, in the configuration indicated in FIG. 11, second portion of material 712 has a larger cross-sectional area 724 than the cross-sectional area 722 of first portion of material 710. Here it may be understood that the cross-sectional areas of each portion varies through the height of each portion so that cross-sectional area 724 and cross-sectional area 722 are only representative cross-sectional areas.

As indicated in FIG. 11, the contact angle 790 with respect to outer surface 611 for the portion of structure 606 formed by first portion of material 710 and second portion of material 712 is greater than 90 degrees. In an exemplary embodiment, contact angle 790 may be in the range between 120 and 160 degrees. Such large contact angles allow for a wider variety of part geometries, with both convex and concave portions being configurable at the bottom-most layer of the structure to enhance design and in some cases functionality of the structure.

Figure 12:
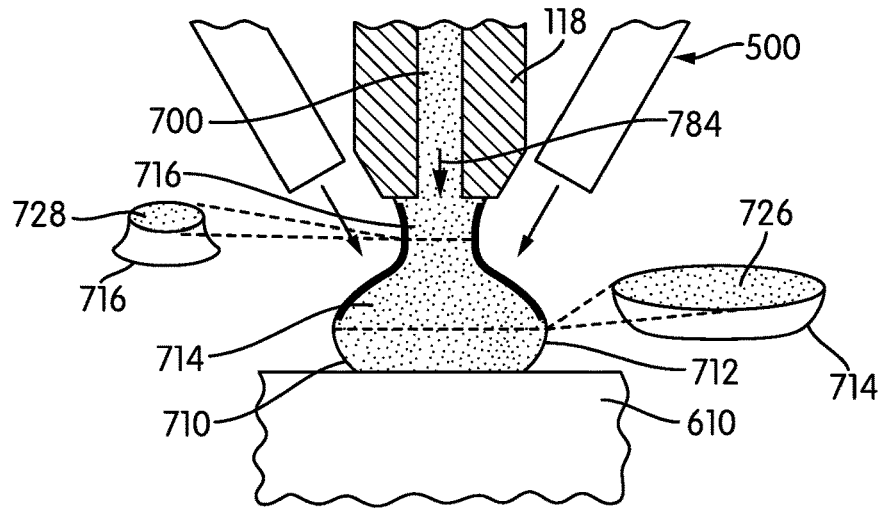

In the configuration shown in FIG. 12, a third portion of material 714 has been extruded onto second portion of material 712. Furthermore, a fourth portion 716 of material 700 has been extruded onto third portion of material 714. Here, third portion of material 714 has a cross-sectional area 726 that is substantially greater than a cross-sectional area 728 of fourth portion of material 714.

At this stage, in some embodiments, curing control devices 500 may be applied to increase the speed at which third portion of material 714 and/or fourth portion of material 716 are cured. This may help ensure that these portions are stable enough to support additional extruded material on top of fourth portion of material 716, and to ensure these portions are cured before their geometries are distorted due to material flow under gravity. In an embodiment where material 700 is a thermoplastic material, curing control devices 500 could be cooling devices that supply cooled air below a predetermined temperature (associated with hardening) to local areas of structure 606 (i.e., areas corresponding to first portion of material 714 and/or second portion of material 716). Once hardened, third portion of material 714 and fourth portion of material 716 correspond to a third portion 744 and a fourth portion 746 of structure 606.

Figure 13:
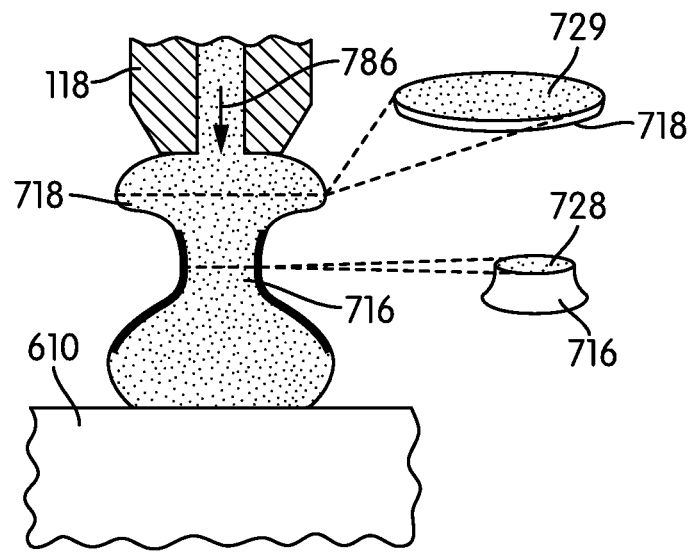

In FIG. 13, a fifth portion of material 718 is extruded onto fourth portion of material 716 to form a fifth portion 748 of structure 606 that comprises the top-most portion of structure 606. As indicated in FIG. 13, fifth portion of material 718 has a cross-sectional area 729 that is substantially greater than the cross-sectional area 728 of fourth portion of material 716.

Once completed, nozzle 118 stops extruding material and pulls away from the formed structure 606 shown in FIG. 14. As seen in FIG. 14, corresponding to the varying cross-sectional areas of the portions of material used to form structure 606, different portions of structure 606 have different cross-sectional areas. For example, a bottom portion of structure 606, which includes first portion 740, second portion 742 and third portion 744, has a representative cross-sectional area 735. Fourth portion 746, forming the middle of structure 606, has a representative cross-sectional area 733, which is less than cross-sectional area 735. Finally, a top portion of structure 606, comprised of fifth portion 748 of structure 606, has a cross-sectional area 731, which is greater than cross-sectional area 733. Thus, it may be seen that this process allows for the formation of structures that vary in cross-sectional geometry from bottom to top, including structures that go from wide, to narrow to wide again. Moreover, this exemplary process could be used to form printed structured having different portions with any combinations of variable cross-sectional areas.

Generally, the formation of portions having different cross-sectional areas may be achieved by varying one or more extrusion control parameters throughout the formation of a 3D printed structure. As already discussed, the amount of spreading of material in the second direction (also referred to as "outward spreading") is due to various factors including flow rate, temperature (related to material viscosity), constriction forces between the nozzle and an underlying portion of material (or base component), as well as other factors. Therefore, adjusting one or more of these parameters throughout the printing of a 3D structure will result in portions of varying outward spread, and therefore varying cross-sectional areas (or diameters).

In order to illustrate an exemplary method for varying an extrusion parameter in the process shown in FIGS. 7-14, a flow rate parameter is indicated schematically in each of FIGS. 7-14 by an arrow oriented along first direction 702. In particular, the magnitude of the flow rate at various stages in the printing process is depicted by variations in arrow length (with shorter arrows indicating relatively slower flow rates and longer arrows indicating relatively faster flow rates). As seen in FIGS. 7-13, the flow rate may generally vary according to the desired cross-sectional area or diameter of a portion. For example, in FIGS. 8-9, the flow rate 780 of material 700 is relatively slow compared to a faster slow rate 782 of material 700 shown in FIGS. 10 and 11. This increase in flow rate may result in a slightly larger cross-sectional area for second portion of material 712 compared to the cross-sectional area of first portion of material 710, as more material is laid down for the same duration of time. As third portion of material 714 is extruded, the flow rate of material 700 is slower than flow rate 782, to create a smaller cross-sectional area for the corresponding portion of structure 606. As shown in FIG. 12, as fourth portion of material 716 is extruded, the flow rate 784 may obtain a minimum value compared to other flow rates occurring during the process, as fourth portion 716 (corresponding to fourth portion 746 of structure 606) has the smallest cross-sectional area of all portions of structure 606. Finally, to achieve a gradually increased cross-sectional area for fifth portion of material 718, flow rate 786 is increased again relative to flow rate 784.

For purposes of clarity, the embodiments depict changes in the flow rate of material 700 as a primary way of controlling the resulting diameter of a formed portion for structure 606. However, it will be understood that any other extrusion control parameters could also be varied, possibly in combination with other extrusion control parameters. For example, another means for controlling the degree of outward spreading of material is the nozzle withdrawal rate, since the constriction of material between the end of the nozzle and underlying material can be a factor in the degree of outward spreading. Thus, for example, forming relatively narrow portions of a structure, such as third portion 744 of structure 606, could be accomplished by increasing the nozzle withdrawal rate so that material is built up vertically with less outward spreading. In at least some embodiments, third portion 744 could be formed with an increased nozzle withdrawal rate (relative to the nozzle withdrawal rate used for forming other portions) and a reduced flow rate (relative to the flow rates used for forming other portions).

Still other embodiments could use variations in nozzle temperature (a proxy for material temperature), ambient temperature, ambient pressure as well as any other extrusion control parameters to vary the geometry (e.g., cross-sectional area) of different portions and/or other material characteristics of different portions (e.g., density, hardness, etc.).

As seen in FIGS. 7-14, this exemplary embodiment may use a fixed nozzle cross-sectional area 760 for extruding material 700. Moreover, cross-sectional area 760 is seen to be substantially smaller than the cross-sectional areas of various portions of structure 606. For example, cross-sectional area 760 is substantially less than cross-sectional area 733 of third portion 716 of structure 606, which is the narrowest portion of structure 606. In still other embodiments, of course, the cross-sectional area (or diameter) of nozzle 118 could be varied to increase (or decrease) the flow rate of material 700.

The exemplary process shown in FIGS. 7-14 may be useful in improving the speed of forming 3D printed structure 606. Specifically, when compared to methods used in other embodiments, where a structure is formed by moving nozzle 118 to form horizontal layers and vertically to build subsequent layers on existing layers, this exemplary process may provide substantially decreased printing times. This may occur since alternative embodiments require a nozzle to move through a path that corresponds to the entire volume of the desired 3D printed part, while the exemplary method may hold the nozzle at a fixed horizontal location and use outward spreading of the material to fill out the intended 3D volume without requiring the nozzle to pass over every horizontal location where material is to be located in the final structure.

FIGS. 15-19 illustrate another embodiment of a process of forming a 3D printed structure from a material 800. Referring to FIGS. 15-19, 3D printed structure 604, comprising a hook or hook-like fastener, is formed using a similar extrusion process described above and shown in FIGS. 7-14. However, in contrast to the embodiment of FIGS. 7-14, the process of FIGS. 15-19 includes moving nozzle 118 in more than just a single direction (e.g., a vertical direction) away from a base component. In particular, as described herein, nozzle 118 may be moved in two approximately perpendicular directions (e.g., a vertical direction and a horizontal direction) to form structure 604.

Figure 15:
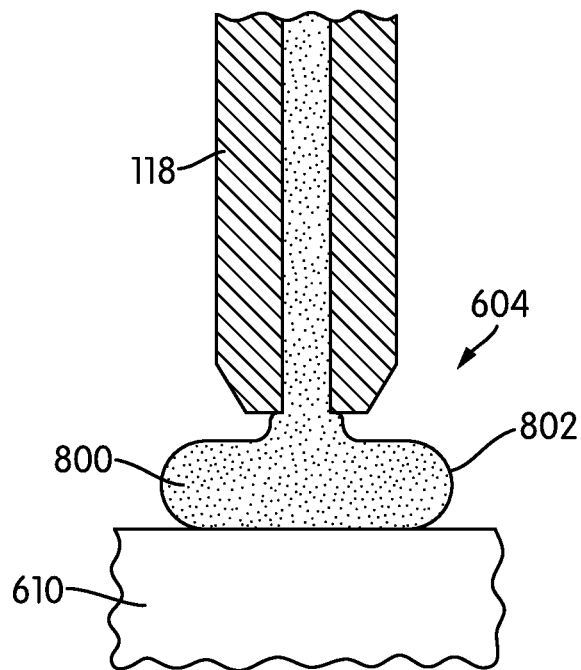
FIGS. 15-19 are schematic views of steps in forming a hook-like structure by extruding material from a nozzle, according to an embodiment.
Figure 16:
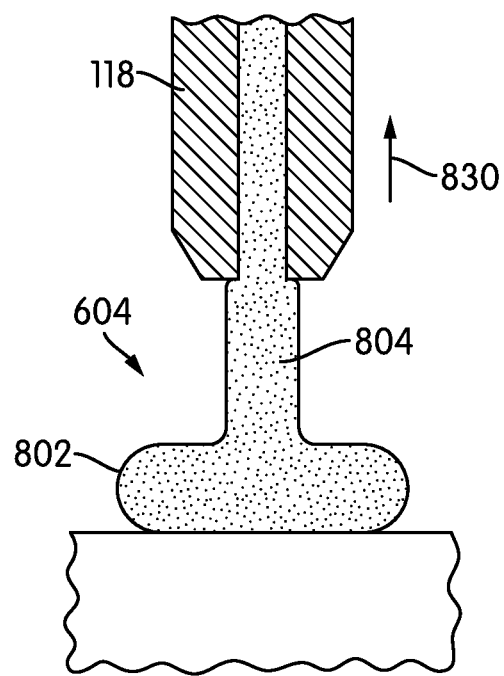
Figure 17:
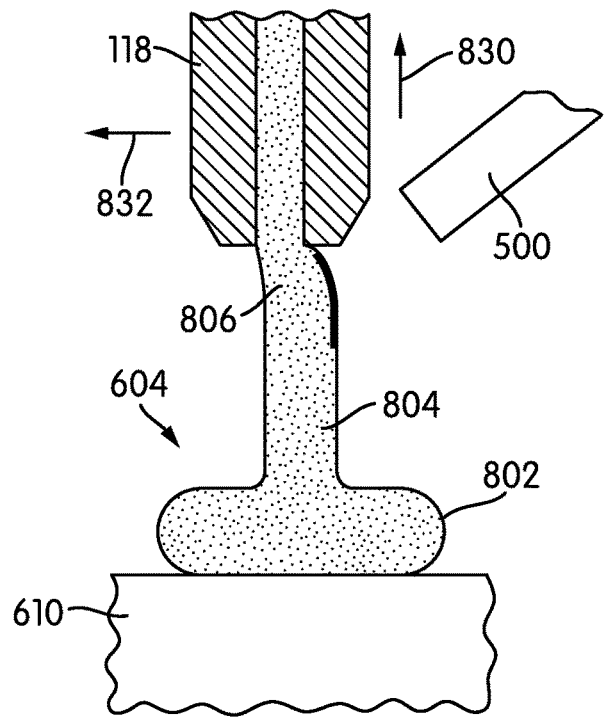
Figure 18:
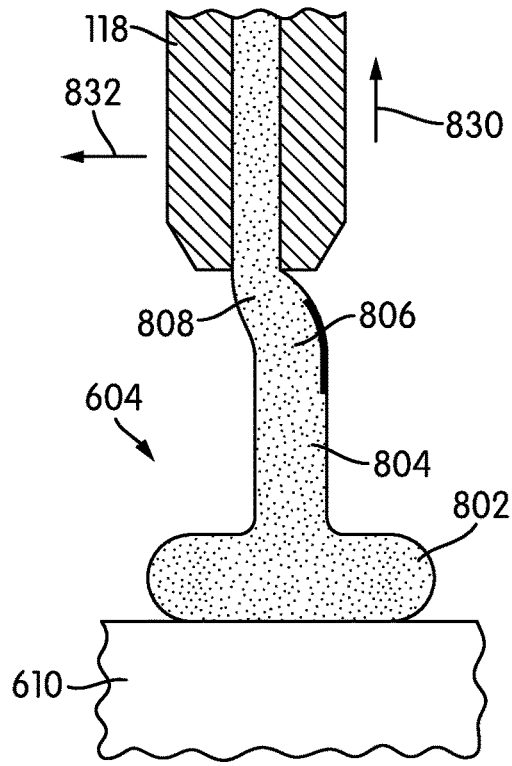

Starting with FIG. 15, nozzle 118 extrudes a first portion of material 802 to form a base portion of structure 606, which is bonded to base component 610. Next, as shown in FIG. 16, nozzle 118 is raised in a first direction 830, for example, a vertical direction, as second portion of material 804 is extruded. As shown in a subsequent configuration in FIG. 17, in order to form a curved portion for structure 604, nozzle 118 may be moved in both the first direction 830 and a second direction 832 (e.g., a horizontal direction), as third portion of material 806 is extruded from nozzle 118. Moreover, in at least some embodiments, curing control device 500 may be applied to third portion of material 806 to decrease curing time so that third portion of material 806 maintains a desired curved and overhanging geometry against the force of gravity that may otherwise cause material 800 to flow down. In FIG. 18, nozzle 118 continues to form a curved portion for structure 604, as fourth portion of material 808 is extruded while nozzle 118 moves in both the first direction 830 and the second direction 832.

In at least some embodiments, nozzle 118 may be capable of changing its orientation with respect to another component or part, such as base component 610. As shown in FIG. 19, in one embodiment, nozzle 118 can be rotated by an angle 850 so that nozzle 118 is no longer oriented in an approximately perpendicular manner to base component 610. Instead, nozzle 118 may be oriented so that extruded material flows from nozzle 118 along a direction associated with central axis 821 of fifth portion of material 810. With nozzle 118 oriented along the direction of central axis 821, material 800 extruded from nozzle 118 may undergo outward spreading that is in a direction approximately perpendicular to central axis 821 of fifth portion of material 810. This perpendicular direction is indicated by lateral axis 820.

By adjusting the orientation of nozzle 118 to better align with a central axis of an adjacent portion of a 3D printed structure, extruded material may build up in a direction along the central axis, rather than building up in a vertical direction or other direction that might create an undesired excess of material in various locations as the structure is formed. Although not shown, some embodiments could use supporting structures that may provide support during formation of a structure, but which may be removed after the structure has been completed and is fully cured.

By moving nozzle 118 in both the vertical and horizontal direction, in combination with rotating or tilting the orientation of nozzle 118, printing system 100 and the processes described above can be used to form parts having a wide variety of geometries and shapes, including portions with various kinds of curved surfaces. Such curved surfaces may be constant in curvature or non-constant in curvature (e.g., compound curves).

Embodiments may include provisions for adjusting one or more extrusion control parameters in response to feedback from sensory information. In some embodiments, an extrusion process can adjust one or more extrusion control parameters in response to optical information.

Figure 20:
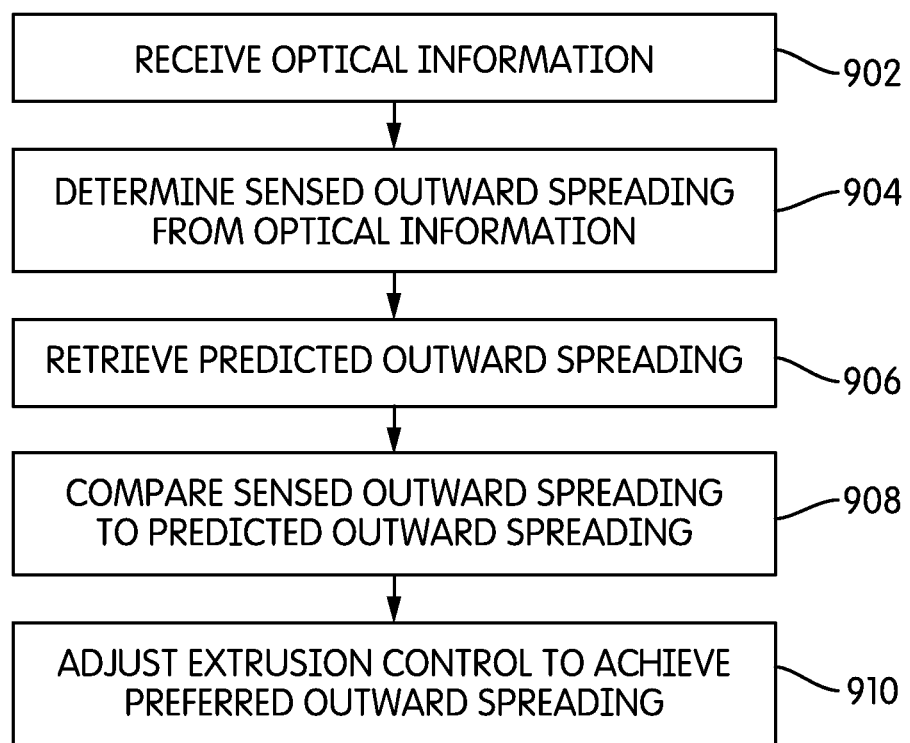
FIG. 20 is an embodiment of a process of adjusting the extrusion of a material according to information received from an optical device.

FIG. 20 illustrates an embodiment of a process for adjusting one or more extrusion control parameters in response to optical information. Generally, one or more of the steps depicted in FIG. 20 may be performed by extrusion control system 204, sensor system 206 and/or any other system or component of printing device 102. In some embodiments, the process of FIG. 20 may include additional steps, while in other embodiments some steps depicted in FIG. 20 may be optional. For purposes of clarity, the following discussion describes steps in this process as being performed by extrusion control system 204.

In a first step 902, extrusion control system 204 may receive optical information. In some embodiments, the optical information may be received from one or more sensors, such as optical sensing device 416. The received optical information can include any kinds of analog and/or digitals signals that include information related to one or more images captured by optical sensing device 416.

In step 904, extrusion control system 204 may use the optical information to characterize the outward spreading for a particular portion of material. The outward spreading of a portion of material could be characterized in various ways. For example, in some embodiments, the outward spreading could be characterized by the cross-sectional area, diameter, or extension along a particular predetermined direction, of the portion of material at a given instant of time. In other embodiments, the outward spreading could be characterized by an outward spreading rate, which is the rate at which the portion of material is spreading in the outward direction. Depending on the application, it may be more useful to use either the absolute extent of spreading of a portion of material at a particular time or the rate of outward spreading of the portion of material at a particular time. In still other embodiments, other characterizations of outward spreading could be used. For purposes of convenience, the particular characterization of outward spreading used for a portion of material at a particular time is referred to as an outward spreading value.

In different embodiments, a measured or sensed outward spreading value could be determined using optical information. In some embodiments, one or more images captured by optical sensing device 416 of a portion of extruded material may analyzed to determine an absolute extent of outward spreading in one or more directions, and/or an outward spreading rate. Any known algorithms for analyzing image data can be used to determine measured or sensed values for absolute outward spreading and/or an outward spreading rate.

In step 906, extrusion control system 204 may retrieve a predicted outward spreading value at a given time from memory (e.g., from a database). In contrast to the measured or sensed outward spreading value, the predicted outward spreading value is a value that is predetermined based on assumed values of material flow rate, nozzle withdrawal rate, extrusion temperature, as well as using possibly other factors. Thus, the predicted outward spreading value indicates how spreading is predicted to occur so that the desired part geometry can be achieved. The predicted outward spreading value could vary from the sensed outward spreading value due to various factors, including, but not limited to: printed material imperfections, variations in base component materials and geometries, variations in ambient conditions (e.g., temperature and pressure) as well as possibly other factors.

In step 908, the sensed outward spreading value is compared with the predicted outward spreading value. If the sensed outward spreading value is within a predetermined tolerance of the predicted outward spreading value, the system may continue extruding material without any adjustments. However, if the sensed outward spreading value differs from the predicted outward spreading value by more than a predetermined tolerance, extrusion control system 204 may proceed to step 910 to make adjustments to one or more extrusion control parameters.

Figure 21:
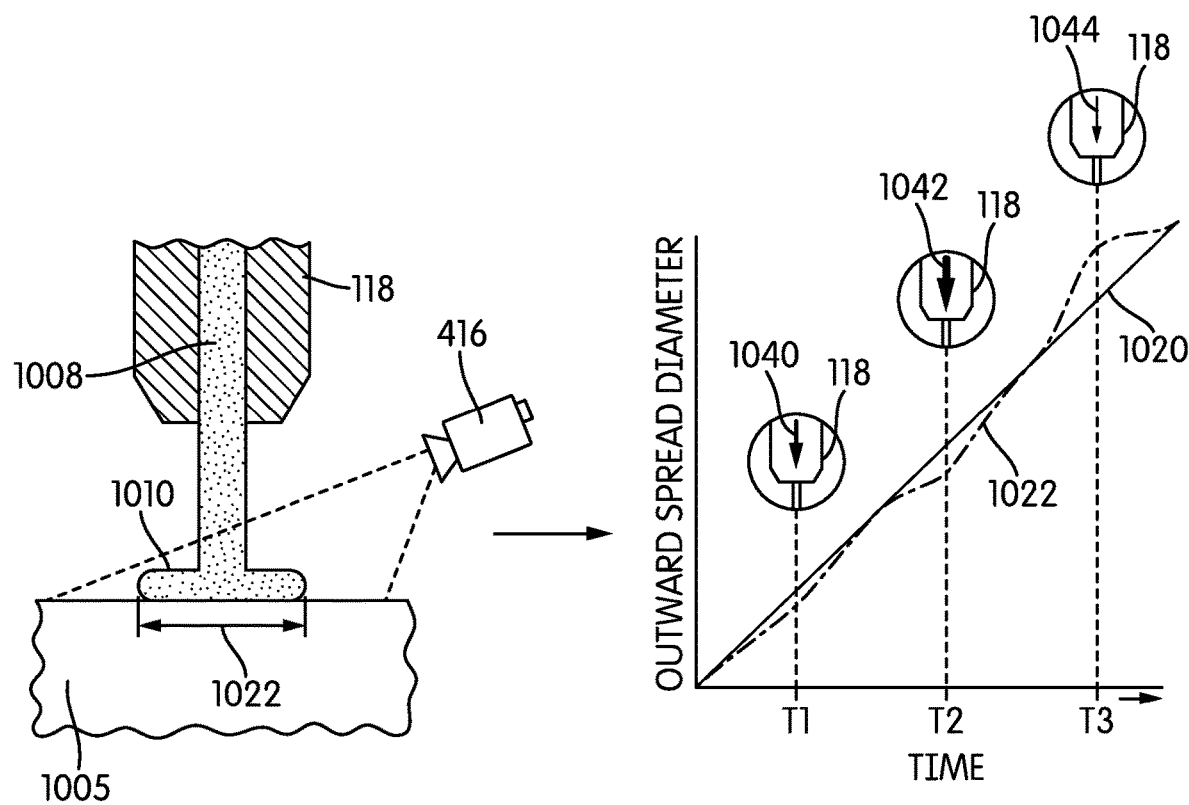
FIG. 21 is a schematic view of a process for sensing outward spreading of a portion of a material and adjusting the flow rate of material extruded from a nozzle in response, according to an embodiment.

FIG. 21 illustrates a schematic view of a process in which optical information is used to provide feedback to an extrusion control system. Referring to FIG. 21, optical sensing device 416 is positioned to capture optical information about a portion of material 1010 after portion of material 1010 has been extruded from nozzle 118. This optical information can be used to determine a sensed outward spreading diameter 1022, which is a real-time measurement of the approximate diameter of portion of material 1010 as it spreads outwardly on base component 1005. In the schematic view of nozzle 118 and portion of material 1010 of FIG. 21, sensed spreading diameter 1022 of portion of material 1010 is shown for a particular instant of time.

In the chart of FIG. 21, sensed outward spreading diameter 1022 is plotted as a function of time. Additionally, predicted outward spreading diameter 1020 is also plotted as a function of time. In this case, predicted outward spreading diameter 1020 follows an approximately straight line, which indicates a generally constant spread of material in time (e.g., a constant spreading rate). It will be understood that predicted outward spreading diameter 1020 is only one exemplary type of function, which is used here for clarity, and in other embodiments the behavior of predicted outward spreading diameter 1020 could be non-linear.

At time T1, predicted outward spreading diameter 1020 and sensed outward spreading diameter 1022 may be approximately the same. In other words, at this point, sensed outward spreading diameter 1022 may be within a predetermined tolerance of predicted outward spreading diameter 1020. This indicates that portion of material 1010 is spreading in the desired manner to form the first portion or layer of the intended 3D printed structure. At a later time T2, however, sensed outward spreading diameter 1022 falls substantially below predicted outward spreading diameter 1020, indicating that portion of material 1010 is not spreading in the desired manner (e.g., at the desired rate). As extrusion control system 204 detects this relative drop in the sensed outward spreading diameter 1022, extrusion control system 204 may adjust the flow rate or extrusion rate of material 1008 to induce faster and/or more spreading in portion of material 1010. In particular, at time T2, the flow rate is increased from the initial flow rate 1040 (associated with time T1) to a new increased flow rate 1042. Following time T2, sensed outward spreading diameter 1022 begins to increase and may fall once again with the predetermined tolerance of predicted outward spreading diameter 1020.

At a later time T3, sensed outward spreading diameter 1022 increases above predicted outward spreading diameter 1020, thereby indicating that portion of material 1010 is flowing too rapidly and possibly extending too far. Therefore, at time T3, the flow rate is adjusted to a new reduced flow rate 1044, which is a substantially lower flow rate than both initial flow rate 1040 (associated with time T1) and flow rate 1042 (associated with time T2). Following time T3, sensed outward spreading diameter 1022 begins to decreased and may fall once again with the predetermined tolerance of predicted outward spreading diameter 1020. This process may therefore be iterative, providing a means of continuously adjusting the flow rate (or other extrusion control parameter) in response to sensed optical information about how a portion of material is spreading. Moreover, though the exemplary process is shown in FIG. 21 for a specific portion of material 1010, corresponding to the lower layer of material in a printed structure, this process may be used for all portions and layers of material in forming a printed structure.

Figure 22:
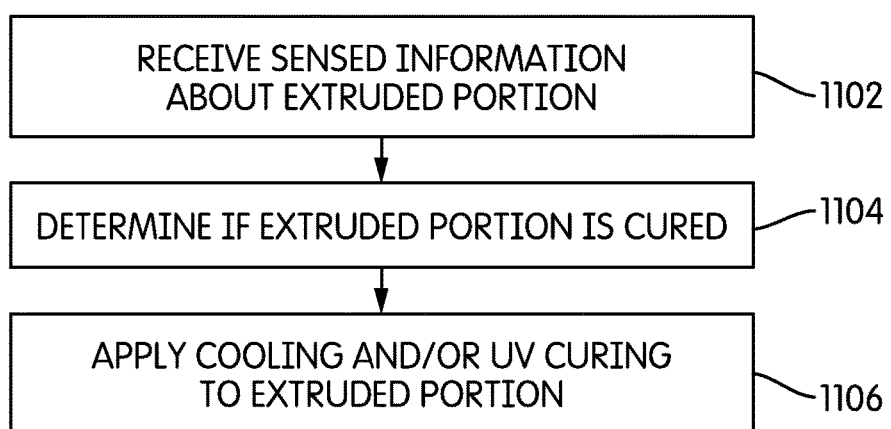
FIG. 22 is an embodiment of a process of modifying the physical properties of a portion of extruded material.
Figure 23:
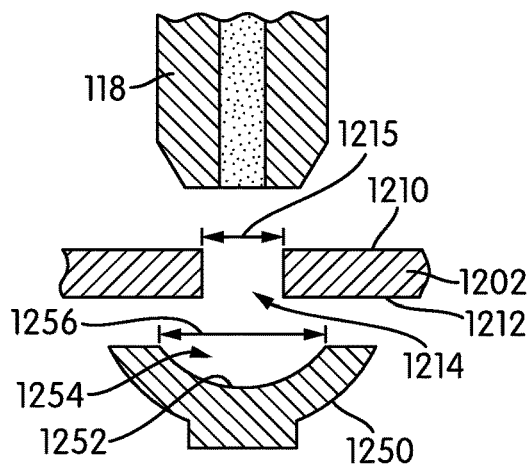
FIGS. 23-27 are schematic views of steps in forming an anchored structure in a base component by extruding material from a nozzle, according to an embodiment.

FIG. 22 illustrates an embodiment of a process for applying a curing control device to a recently extruded portion of material in response to sensed information about the recently extruded portion of material. In step 1102, extrusion control system 204 may received sensed information from one or more sensors about the extruded portion and/or ambient conditions. Exemplary sensors that may supply information to extrusion control system 204 include temperature sensors, pressure sensors, flow rate sensors, optical sensors as well as possibly other kinds of sensors. In step 1104, extrusion control system 204 uses the sensed information to determine if the recently extruded portion of material is cured. For example, in some embodiments optical information could be used to determine if an extruded portion is stable or non-moving, and therefore likely cured. If the recently extruded portion is not yet cured and it necessary to set the portion of material before extruding more material, a curing control device may be used to cure the portion of material directly. In this case, extrusion control system 204 moves to step 1106 to apply cooling and/or UV curing to the extruded portion.

Of course, in some embodiments, direct application of a curing control device to one or more portions of an extruded material to increase the speed of curing can be done automatically, without relying on sensed information. In particular, as already depicted in earlier embodiments, direct curing (e.g., cooling) can be done to increase curing speed as part of the process of forming portions with particular geometries that may require quick curing to remain stable during the printing process.

Embodiments can include provisions for applying three-dimensional printed structures that may be anchored to a base component, such as a textile material. In embodiments using an extrusion process that results in outward spreading of extruded material, it may be possible to induce outward spreading of material on an opposing side of a base component from the side where the nozzle is located. This may allow for the creation of anchoring portions that might not be achievable with alternative processes that require a nozzle to pass above all locations within a volume associated with a printed structure.

FIGS. 23-27 illustrate schematic views of an embodiment of a process for printing a 3D anchoring structure 1200 that is anchored directly to base component 1202 as it is formed. As seen in FIGS. 23-27, the exemplary process may utilize nozzle 118, base component 1202 and a molding component 1250. Nozzle 118 may be disposed on a first side 1210 of base component 1202, while molding component 1250 may be disposed on a second side 1212 of base component 1202. Moreover, to provide fluid communication between first side 1210 and second side 1212, base component 1202 includes an opening 1214.

Figure 24:
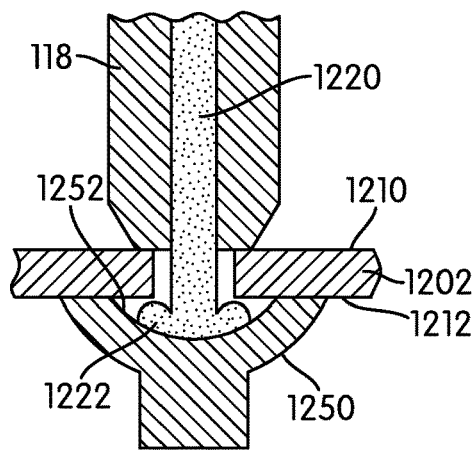
Figure 25:
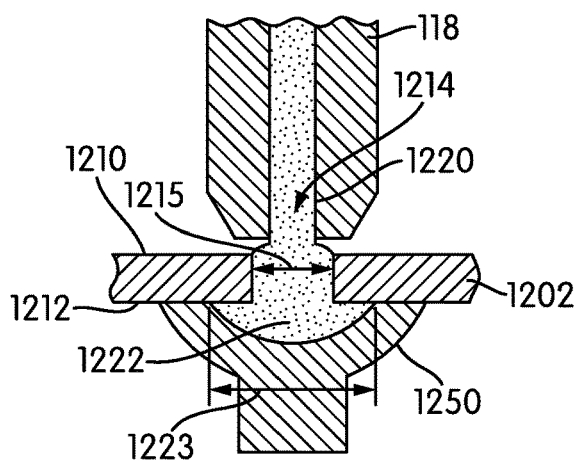

As seen in FIG. 24, material 1220 is extruded from nozzle 118 and flows through opening 1214. With molding component 1250 in place against second side 1212 of base component 1202, first portion of material 1222 flows into cavity 1252 of molding component 1250. In FIG. 25, first portion of material 1222 fills the entirety of cavity 1252. Because opening 1254 of cavity 1252 has a diameter 1256 (see FIG. 23), first portion of material 1222 obtains a diameter 1223 directly adjacent to second side 1212 of base component 1202. Moreover, since diameter 1223 of first portion of material 1222 is greater than diameter 1215 of opening 1214, first portion of material 1222 is prevented from passing through opening 1214.

Figure 26:
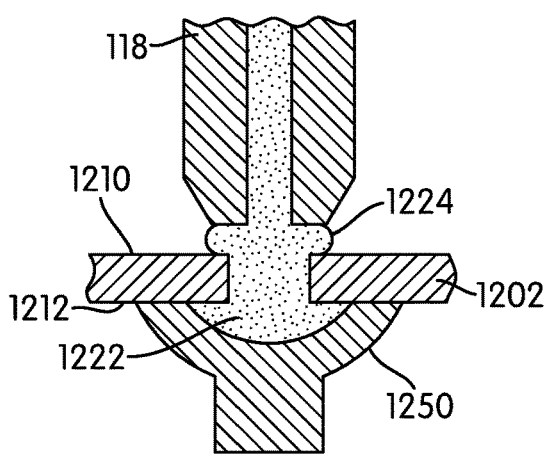
Figure 27:
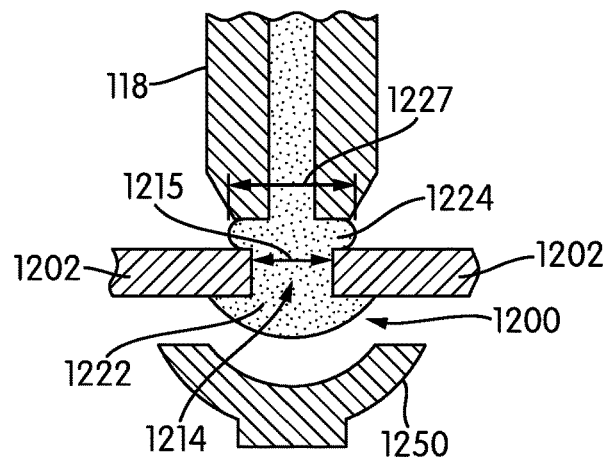

In FIG. 26, a second portion of material 1224 is extruded from nozzle 118 and begins to spread laterally on first side 1210 of base component 1202. In the FIG. 27, second portion of material 1226 is seen to obtain a diameter 1227 that is substantially larger than diameter 1215 of opening 1214. Thus, the anchoring structure 1200 is formed in a manner such that anchoring structure 1200 cannot be separated from base component 1202 without irreversibly damaging either base component 1202 or anchoring structure 1200.

With anchoring structure 1200 formed as in the process depicted in FIGS. 23-27, additional extruded material can be added to form various 3D structures extending away from first side 1210 of base component 1202. These structures could include any of the 3D printed structures already discussed, such as cleats, hooks, knob-like fasteners as well as other structures.

Anchoring of a structure may be achieved using a single aperture, or could be accomplished using two or more apertures. The number of apertures used could vary according to the type of base component used as well as the geometry of the formed 3D structure.

In different embodiments, the type of molding component used could vary. For example, molding components could vary in size, cavity shape, material construction as well as in other properties. Any kinds of molds known in the art could be used. The type of mold used could be selected according to the desired geometry of the final structure (especially the geometry of the part on second side 1212 of base component 1202), required part sizes, temperature tolerances of the mold material, as well as possibly other factors.

Figure 28:
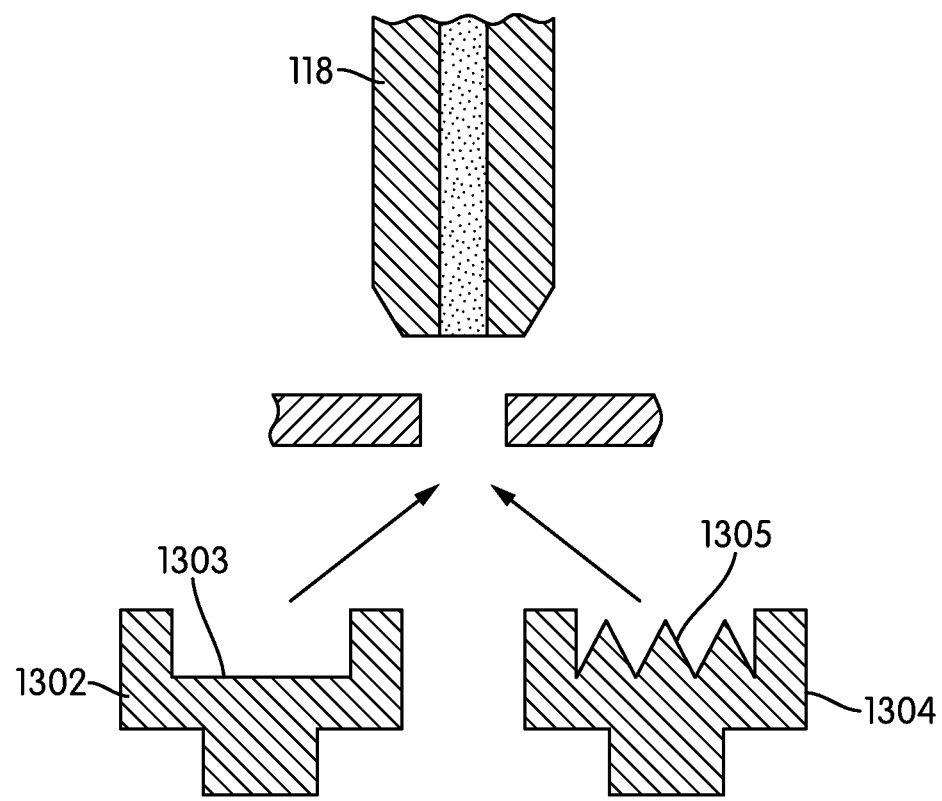
FIG. 28 is a schematic view of an embodiment of several different molding components that may be used with a three-dimensional printing system.

As one example of variations in a molding component, FIG. 28 illustrates two alternative designs. Referring to FIG. 28, a first molding component 1302 has a cavity 1303 with a generally rectangular geometry, as opposed to the approximately rounded (or dome-like) geometry of cavity 1252 of molding component 1250 in FIG. 23. Also, second molding component 1304 has a cavity 1305 with a generally irregular geometry. These variations in cavity geometry may result in corresponding variations in the geometry of the formed 3D structures (for the portions of the structures on the side of the base component where the mold is placed).

Figure 29:
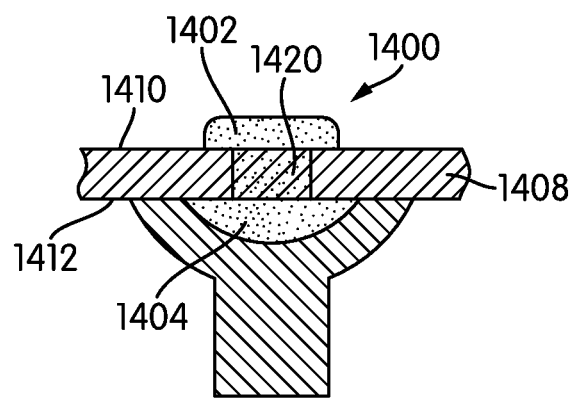
FIG. 29 is a schematic view of an embodiment of a structure anchored within a base component, in which portions of the structure extend through spaces in the material of the base component.

In some other embodiments, anchoring structures could be created by pushing extruded material through a material, such as a knit, mesh or braided fabric, which may not include distinct apertures. Such an embodiment is depicted in FIG. 29. Here, anchored structure 1400 includes a first portion 1402 on first side 1410 of base component 1408, and a second portion 1404 on a second side 1412 of base component 1408. First portion 1402 and second portion 1404 are connected by extruded material portions 1420, which have been pushed through the open spaces in base component 1408.

Figure 30:
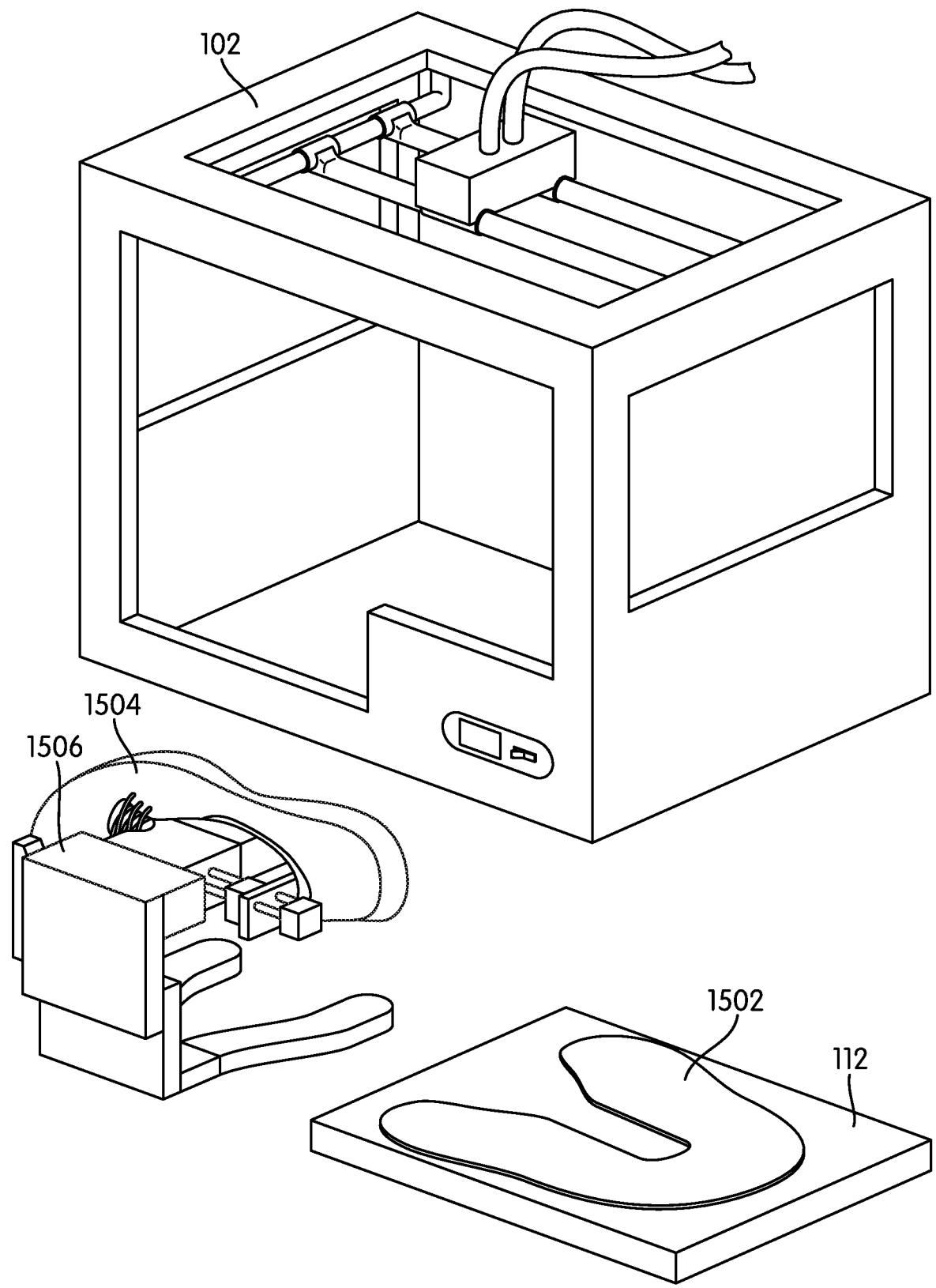
FIG. 30 is a schematic view of an embodiment of different configurations for associating portions of an article with a three-dimensional printing system.

FIG. 30 illustrates an exemplary embodiment of a printing device 102 along with two different methods for holding or supporting articles that may receive printed structures. As seen in FIG. 30, in some embodiments, a flat upper portion 1502 may be placed on a tray 112 that is housed within printing device 102. In other embodiments, an assembled article of footwear 1504 may be associated with a footwear holding device 1506, which may be inserted into printing device 102. In some embodiments, footwear holding device 1506 may be configured to present an approximately flattened portion of article of footwear 1504 to a nozzle for printing. An exemplary footwear holding device that could be used is disclosed in Miller, U.S. Patent Publication Number 2014/0310891, published on Oct. 23, 2014 (now U.S. patent application Ser. No. 13/868,130, filed Apr. 23, 2013) and titled "Holding Assembly for Articles," the entirety of which application is herein incorporated by reference.

General systems and methods for printing 3D structures directly onto portions of articles, including articles comprised of textiles are disclosed in Jones et al., U.S. Patent Application Publication Number 2014/0020192, published Jan. 23, 2014 (now U.S. patent application Ser. No. 13/553, 368, filed Jul. 19, 2012), and entitled "Footwear Assembly Method with 3D Printing," the entirety of which application is herein incorporated by reference and hereafter referred to as the "3D Printing" application. In particular, the 3D printing application includes systems and methods for printing onto textiles or base components that may not have hydrophobic or non-wetting surfaces. The 3D printing application also teaches systems and methods for printing onto irregular surfaces such as those encountered in woven, knit, braided or other kinds of fabrics or textile materials.

Figure 31:
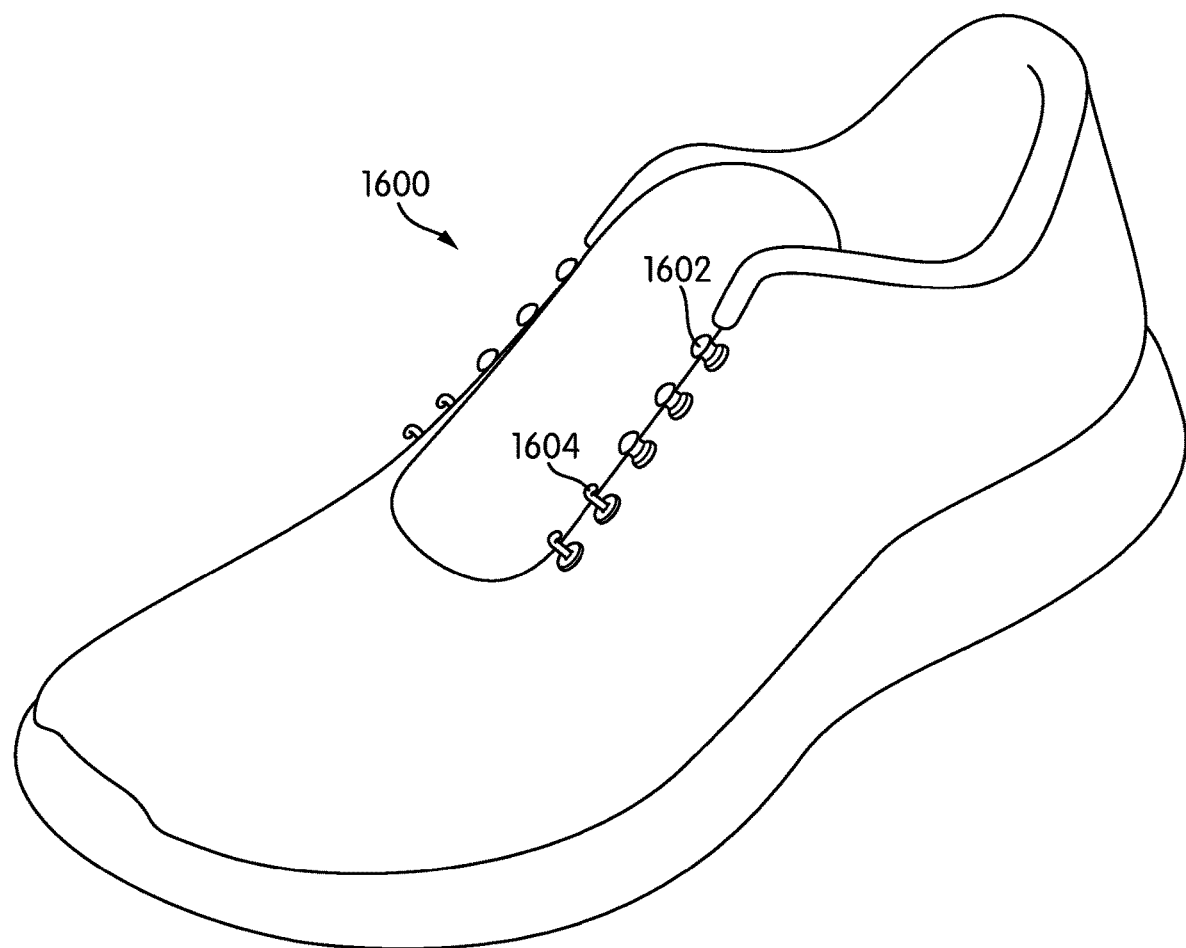
FIG. 31 is a schematic isometric view of an embodiment of an article of footwear including various structures formed by a three-dimensional printing process.

FIG. 31 is an isometric view of an embodiment of an article of footwear 1600. As seen in FIG. 31, article of footwear 1600 includes a plurality of 3D printed structures in the form of fasteners that may be engaged by a lace or other fastening provision. Specifically, article of footwear 1600 includes a set of knob-like fasteners 1602 that have been formed using a 3D printing process as previously discussed and shown in FIGS. 7-14. Additionally, article of footwear 1600 includes a set of hook fasteners 1604 that have been formed using a 3D printing process as previously discussed and shown in FIGS. 15-19. Thus, it may be seen that the exemplary printing (specifically, extrusion) process discussed in these embodiments can be used to form functional structures, such as fasteners, for articles of footwear and as well as other kinds of articles.

Embodiments can include further provisions to improve the speed of forming 3D printed structures. In some embodiments, a 3D printed structure can be formed using two different printing processes to form at least two different portions of the 3D printed structure. In some cases, for example, a first portion of a 3D printed structure may be formed using a first 3D printing process, while a second portion of the 3D printed structure may be formed using a second 3D printing process that is distinct from the first 3D printing process.

Figure 32:
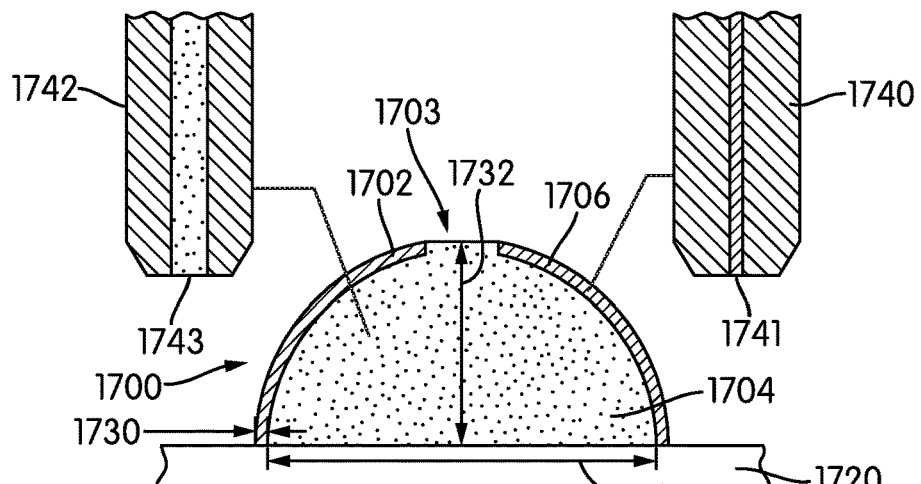
FIG. 32 is a schematic view of an embodiment of a structure comprised of distinct materials, where each material is applied using a different nozzle.

FIG. 32 illustrates a schematic view of an embodiment of a 3D printed structure 1700, or simply structure 1700, which is attached to base component 1720. In the embodiment of FIG. 32, structure 1700 has the form of a cleat for use with an article of footwear. However, in other embodiments similar printed structures could be formed in a variety of different shapes and for different purposes. In other words, the principles discussed for structure 1700 are not intended to be limited to making cleats or similar parts.

In the embodiment depicted in FIG. 32, structure 1700 is comprised of two different portions. In particular, structure 1700 includes an outer shell portion 1702 and an inner portion 1704. As discussed in further detail below, outer shell portion 1702 and inner portion 1704 may differ in one or more characteristics, including size, volume, shape, material, color, as well as possibly other characteristics.

In different embodiments, the geometry of outer shell portion 1702 can vary. In some embodiments, outer shell portion 1702 may have a generally rounded geometry. In some cases, for example, outer shell portion 1702 could have a dome-like geometry. In other embodiments, outer shell portion 1702 could have a generally conical geometry. In some cases, for example, outer shell portion 1702 could have a truncated conical geometry.

In at least some embodiments, outer shell portion 1702 may include one or more openings. In some embodiments, outer shell portion 1702 could include a single opening. In other embodiments, outer shell portion 1702 could include two openings. In still other embodiments, outer shell portion 1702 could include three or more openings. In the embodiment depicted in FIG. 32, outer shell portion 1702 includes a single opening 1703.

In different embodiments, the location of one or more openings in outer shell portion 1702 could vary. In some embodiments, one or more openings could be disposed on a portion of outer shell portion 1702 located adjacent to base component 1720. In other embodiments, one or more openings could be disposed on a portion of outer shell portion 1702 disposed furthest from base component 1720. In the embodiment depicted in FIG. 32, opening 1703 of outer shell portion 1702 is disposed at tip portion 1706 of outer shell portion 1702.

In some embodiments, outer shell portion 1702 may comprise a generally thin portion of material. In some embodiments, the thickness 1730 of outer shell portion 1702 may be substantially less than a diameter 1731 of outer shell portion 1702. Further, in some embodiments, the thickness 1730 of outer shell portion 1702 may be substantially less than a height 1732 (as measured from base component 1720) of outer shell portion 1702. In an exemplary embodiment, thickness 1730 of outer shell portion 1702 may have a value approximately in the range between 0.01 millimeters and 5 millimeters. In still other embodiments, thickness 1730 could be greater than 5 millimeters.

Inner portion 1704 may generally fill the interior region bounded by outer shell portion 1702. Therefore, the geometry of inner portion 1704 may generally correspond to the geometry of outer shell portion 1702. In embodiments where outer shell portion 1702 has an approximately dome-like geometry, inner portion 1702 may also have a dome-like geometry. In embodiments where outer shell portion 1702 has a conical (including truncated conical) geometry, inner portion 1704 may have a similar conical geometry. In other embodiments, however, it is contemplated that the interior region bounded by outer shell portion 1702 does not have a geometry corresponding to the geometry of the exterior side of outer shell portion 1702. In such cases, the geometry of inner portion 1704 may generally correspond to the geometry induced by the shape of the interior side of outer shell portion 1702.

In some embodiments, an outer shell portion may comprise a relatively small percentage of the total volume of a 3D printed structure while an inner portion can comprise a large percentage (at least a majority) of the total volume of the 3D printed structure. For example, in the embodiment of FIG. 32, outer shell portion 1702 is seen to have a first volume comprising a first percentage of the total volume of structure 1700. Also, inner portion 1704 is seen to have a second volume comprising a second percentage of the total volume of structure 1700. In an exemplary embodiment, the second percentage is substantially greater than the first percentage, so that outer shell portion 1702 only comprises a small percentage of the total volume of structure 1700, while inner portion 1704 comprises a large percentage of the total volume of structure 1700.

Values of the first percentage and the second percentage can vary from one embodiment to another. In some embodiments, the first percentage may have a value approximately in the range between 1 percent and 30 percent. Correspondingly, in such embodiments, the second percentage may have a value approximately in the range between 70 percent and 99 percent. Here it is to be understood that the total of the first percentage and the second percentage should equal 100 percent in embodiments where structure 1700 consists of only outer shell portion 1702 and inner portion 1704.

In some embodiments, outer shell portion 1702 may be formed using a first 3D printing process, while inner portion 1704 may be formed using a second 3D process that is distinct from the first 3D printing process. Using different printing processes for each portion may allow for improvements in efficiency and/or manufacturing speed. For example, the following embodiments illustrate printing methods where outer shell portion 1702 is formed using a relatively slow printing process, while inner portion 1704 is formed using a relatively faster printing process. Because inner portion 1704 comprises a majority of the volume of structure 1700, such printing methods may allow structure 1700 to be formed in a significantly shorter period of time than if the volume of structure 1700 were printed using the relatively slow printing process.

As shown in FIG. 32, in at least some embodiments, outer shell portion 1702 and inner portion 1704 may be formed using different nozzles and/or print heads. In one embodiment, outer shell portion 1702 may be formed using a first nozzle 1740 while inner portion 1704 may be formed using a second nozzle 1742. In some embodiments, first nozzle 1740 has a first aperture 1741 while second nozzle 1742 has a second aperture 1742. In one embodiment, first aperture 1741 may have a substantially smaller diameter than second aperture 1742. With this configuration, a greater total volume of material may flow through second aperture 1742 than through first aperture 1741 for a given interval of time.

Although some embodiments may use different nozzles to form outer shell portion 1702 and inner portion 1704, other embodiments may use a single nozzle to form both outer shell portion 1702 and inner portion 1704. Such an alternative embodiment is described below and shown in FIGS. 36-38.

In different embodiments, the materials comprising outer shell portion 1702 and inner portion 1704 could vary. In some embodiments, outer shell portion 1702 may be comprised of a first material and inner portion 1704 may be comprised of a second material. In some cases, the first material may be substantially identical to the second material. In other cases, the first material may be substantially different from the second material.

In different embodiments, the rigidities of the first material and the second material could vary. For example, when cured, the first material forming the outer shell portion may have a first rigidity, while the second material forming the inner portion may have a second rigidity when cured. In some embodiments, the second rigidity may be greater than the first rigidity. As an example, in some embodiments for a cleat structure, the first material could be a rubber to provide traction and give to the outer shell portion, while the inner portion may be a harder plastic to provide structure and support to the cleat structure. In other embodiments, the second rigidity could be less than the first rigidity. As an example, in some embodiments of a cleat structure, the first material could be hard rubber or plastic to provide strength and/or traction for the outer shell portion, while the second material could be a foam material for support and cushioning.

Of course in other embodiments still other combinations of materials could be used. In particular, the first material and the second material could be selected to achieve various combinations of materials that differ in properties including, but not limited to: weight, strength, cushioning, bonding compatibility with a base component as well as other material properties.

Figure 33:
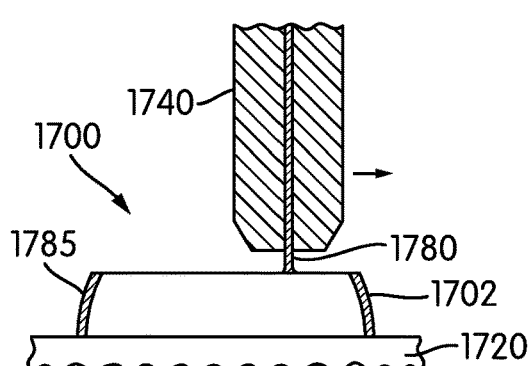
FIGS. 33-35 illustrate a schematic view of steps of forming a structure by forming an outer shell portion and then filling in the interior of the outer shell portion, where different nozzles are used for each material, according to an embodiment.
Figure 34:
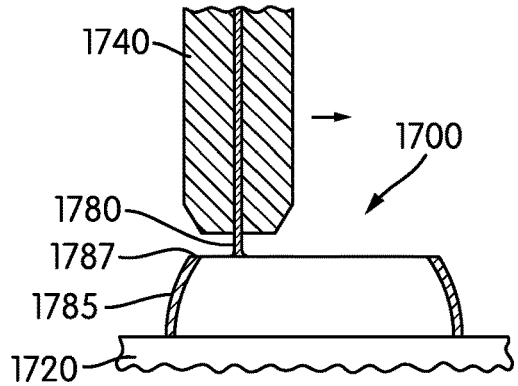
Figure 35:
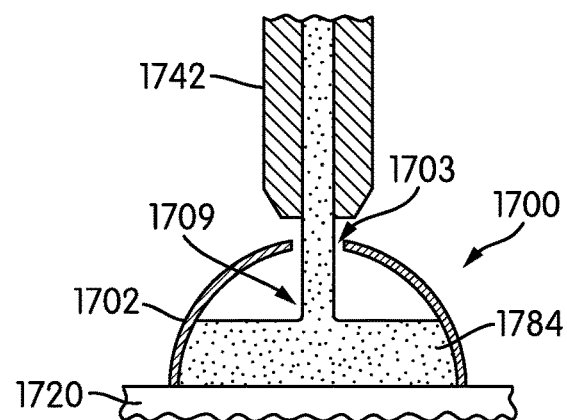

FIGS. 33-35 illustrate schematic views of an embodiment of a process for forming structure 1700. As seen in FIG. 33, outer shell portion 1702 may be formed first using first nozzle 1740. As indicated schematically, outer shell portion 1702 may be formed using a first 3D printing process. Specifically, the first 3D printing process includes moving first nozzle 1740 horizontally over base component 1720 so as to form a horizontal layer of outer shell portion 1702 using extruded material 1780. Unlike the embodiments discussed previously and shown, for example, in FIGS. 7-14, the first 3D printing process does not involve substantial outward spreading of the printed (or extruded) material. Once a horizontal layer has been formed, for example printed layer 1785 shown in FIG. 33, first nozzle 1740 may be raised an incremental amount in the vertical direction. At this point, as shown in FIG. 34, first nozzle 1740 may again move in a horizontal manner to form a subsequent layer of printed material 1787 on top of printed layer 1785.

In at least some embodiments, once outer shell portion 1702 has been fully formed, outer shell portion 1702 could be cured prior to forming inner portion 1704. In some cases, the curing could be accomplished as outer shell portion 1702 is formed. In other cases, the curing could be accomplished after outer shell 1702 has been formed, but before inner portion 1704 has been formed. In still other embodiments, however, outer shell portion 1702 could be fully (or partially) cured after inner portion 1704 is formed.

Once outer shell portion 1702 has been formed by the first 3D printing process, first nozzle 1740 may be moved away from outer shell portion 1702. As seen in FIG. 35, second nozzle 1742 may be moved to a position above opening 1703. At this point, a second 3D printing process may be used to fill interior void 1709 of outer shell portion 1702 with second material 1784. As shown in FIG. 35, the second 3D printing process may involve maintaining second nozzle 1742 in a substantially fixed position above opening 1703 as second material 1784 is extruded or otherwise deposited into interior void 1709. The second 3D printing process may continue until second material 1784 fills the entirety of interior void 1709, thereby forming inner portion 1704 of structure 1700.

The first 3D printing process used to form outer shell portion 1702 and the second 3D printing process used to form inner portion 1704 may be differ in one or more attributes. As already mentioned, the first 3D printing process comprises moving first nozzle 1740 through a sequence of positions disposed in a horizontal plane to form a horizontal layer of material. Upon the formation of a horizontal layer, first nozzle 1740 may be briefly raised in the vertical direction to form a subsequent horizontal layer. In contrast, the second 3D printing process comprises maintaining second nozzle 1742 at an approximately fixed vertical and horizontal position, and extruding second material 1784 through opening 1703 of outer shell portion 1702. Unlike outer shell portion 1702, therefore, inner portion 1704 is not formed via a process of printing a series of stacked horizontal layers, but is instead formed by forcing second material 1784 into interior void 1709. It can therefore be seen that the resulting geometry of outer shell portion 1702 is defined by the tooling path taken by first nozzle 1740 during the first 3D printing process, while the resulting geometry of inner portion 1704 is induced by the interior geometry of interior void 1709, and requires little to no movement of second nozzle 1742.

The first 3D printing process and the second 3D printing process may also be distinguished by the degree of outward spreading. The first 3D printing process may deposit material in very fine layers, which result in little to no outward spreading. In particular, the degree of outward spreading for material deposited using the first 3D printing process may be less than 200% of the diameter of aperture 1741 of first nozzle 1740 (see FIG. 32). In other words, material printed by first nozzle 1740 may not spread to a size more than twice the diameter of first nozzle 1740. In contrast, the second 3D printing process relies on substantial outward spreading to fill interior void 1709 of outer shell portion 1702. Thus, outward spreading of material extruded from second nozzle 1742 may be many times larger than the diameter of aperture 1743 of second nozzle 1742 (see FIG. 32). For example, in some embodiments, portions of material may spread to diameters of at least 500% of the diameter of aperture 1743.

The exemplary process for forming structure 1700 may allow for improvements in printing speed while maintaining precision for the geometry of printed structures. This is accomplished by printing a relatively thin outer shell portion having any desired geometry using a precisely controlled printing process and then filling in the interior of the outer shell portion by quickly extruding or otherwise depositing printed material into the interior. By forming only a thin outer shell for the structure using the first 3D printing process and forming a bulk of the volume using the second 3D printing process, the printing time of structure 1700 may be decreased, as the second 3D printing process is generally a quicker than the first 3D printing process.

It will be understood that the process for forming outer shell portion 1702 is only intended to be exemplary. In other embodiments, outer shell portion 1702 could be formed using any known 3D printing process. Some exemplary printing processes include any of those previously mentioned.

Figure 36:
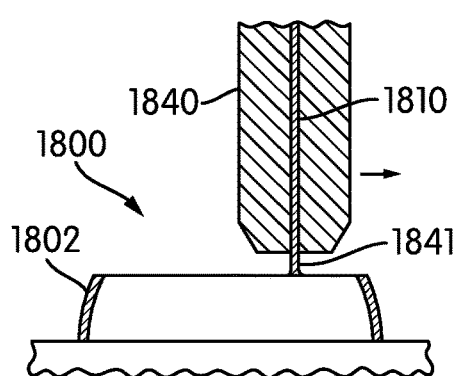
FIGS. 36-38 illustrate a schematic view of steps of forming a structure by forming an outer shell portion and then filling in the interior of the outer shell portion, where the same nozzle is used for each material, according to an embodiment.
Figure 37:
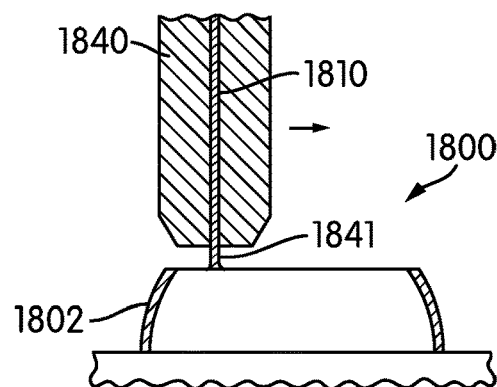
Figure 38:
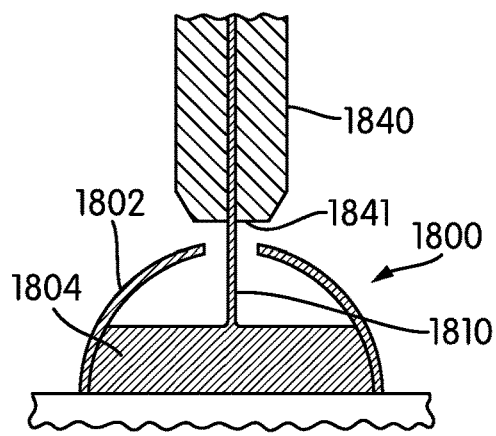

FIGS. 36-38 illustrate an alternative process for forming a 3D printed structure 1800. Generally, the process shown in FIGS. 36-38 may be similar in at least some respects to the process shown for FIGS. 33-35. In particular, the process of FIGS. 36-38 includes using a first 3D printing process and a second 3D printing process that may be different. However, in contrast to the embodiment shown in FIGS. 33-35, the embodiment depicted in FIGS. 36-38 uses a single nozzle 1840 to form both outer shell portion 1802 and inner portion 1804 of structure 1800. Although nozzle 1840 may be used in both the first 3D printing process and the second 3D printing process, in at least some cases, the size of aperture 1841 may be variable. Moreover, in some embodiments, other extrusion control parameters could be adjustable. By varying the size of aperture 1841 and/or additional extrusion control parameters, nozzle 1840 may be configured to extrude printing material 1810 at a substantially higher flow rate during the second 3D printing process.

Although FIGS. 36-38 illustrate an embodiment using a single material to form inner and outer portions of a printed structure, other embodiments could use different materials. For example, in some embodiments, following the formation of outer shell portion 1802 by extruding a first material through nozzle 1840, a second material could be extruded through nozzle 1840 to form inner portion 1804.

Figure 39:
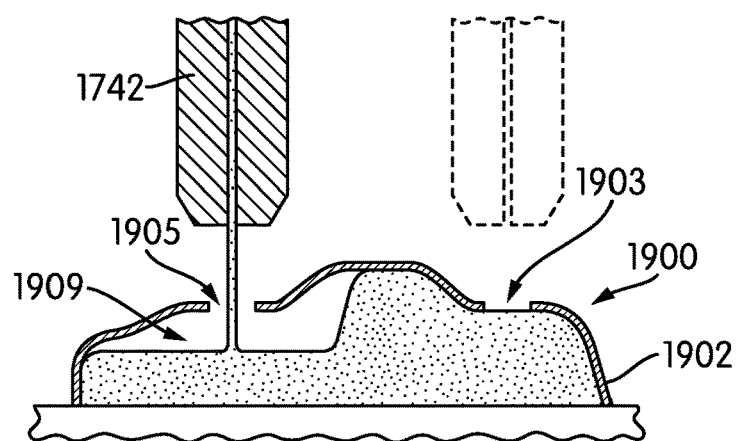
FIG. 39 is a schematic view of an embodiment of a structure with an outer shell portion having at least two openings.

To ensure that an extruded material can completely fill the interior void of an outer shell portion, some embodiments can include outer shell portions with two or more openings. FIG. 39 is a schematic view of an embodiment of a 3D printing structure 1900, which may be formed using the first 3D printing process and second 3D printing process described above and shown in FIGS. 33-35. In the embodiment of FIG. 39, printed structure 1900 may include at least two openings: a first opening 1903 and a second opening 1905 in outer shell portion 1902. In this configuration, nozzle 1742 may initially fill first opening 1903, then move to a position over second opening 1905 and fill interior void 1909 through second opening 1905. The use of multiple openings may facilitate the filling of the interior void, especially for larger outer shell portions and/or outer shell portions having complex geometries.

FIGS. 40-46 illustrate a variety of different embodiments of 3D printed structures, as well as methods for forming 3D printed structures. In the embodiment shown in FIGS. 40-41, 3D printed structure 2000 may comprise an outer shell portion 2002 and an inner portion 2004. In this embodiment, outer shell portion 2002 may be include multiple anchored portions 2010. In some embodiments, outer shell portion 2002 includes seven anchored portions that are secured within base component 2020. However, in other embodiments, any other number of anchored portions could be used.

Anchored portions 2010 can be formed in any manner. In at least some embodiments, anchored portions 2010 can be formed using the printing process described above and shown in FIGS. 23-27. Specifically, in some cases, anchored portions 2010 may be formed by extruding material 2030 through an opening 2032 in base component 2020, which is then received into a molding component 2034 on an opposing side of base component 2020. In some cases, this process can be used to form each of the anchored portions 2010 of structure 2000. In some cases, with anchored portions 2010 formed, the remaining portions of outer shell portion 2002 may be formed using the printing process described above and shown in FIGS. 33-34, i.e., by building up horizontal layers of outer shell portion 2002. In some embodiments, inner portion 2004 may be formed using the printing process shown in FIG. 35, i.e., by extruding material into an interior of outer shell portion 2002.

Figure 40:
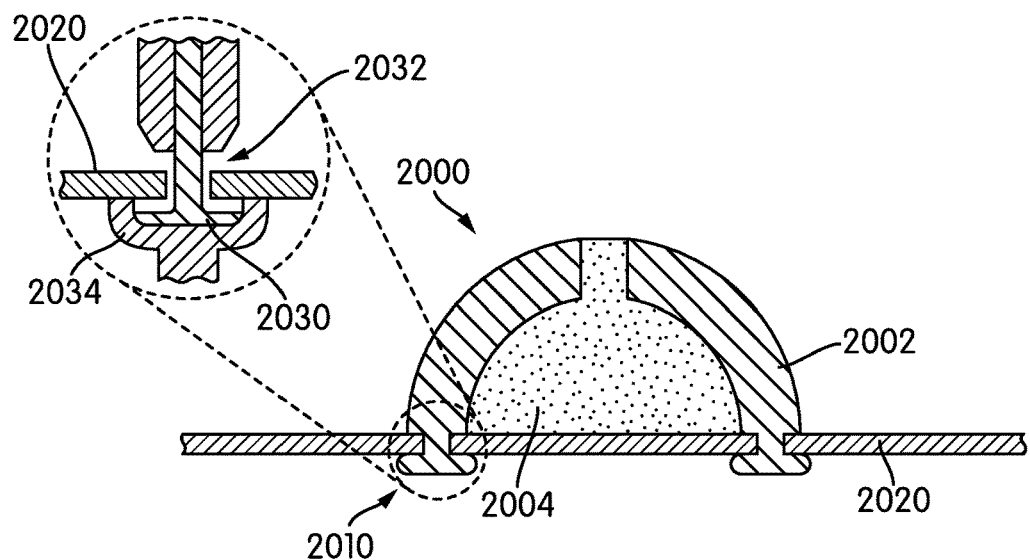
FIG. 40 is a schematic cross-sectional view of an embodiment of a structure with an outer shell portion anchored in a base component.
Figure 41:
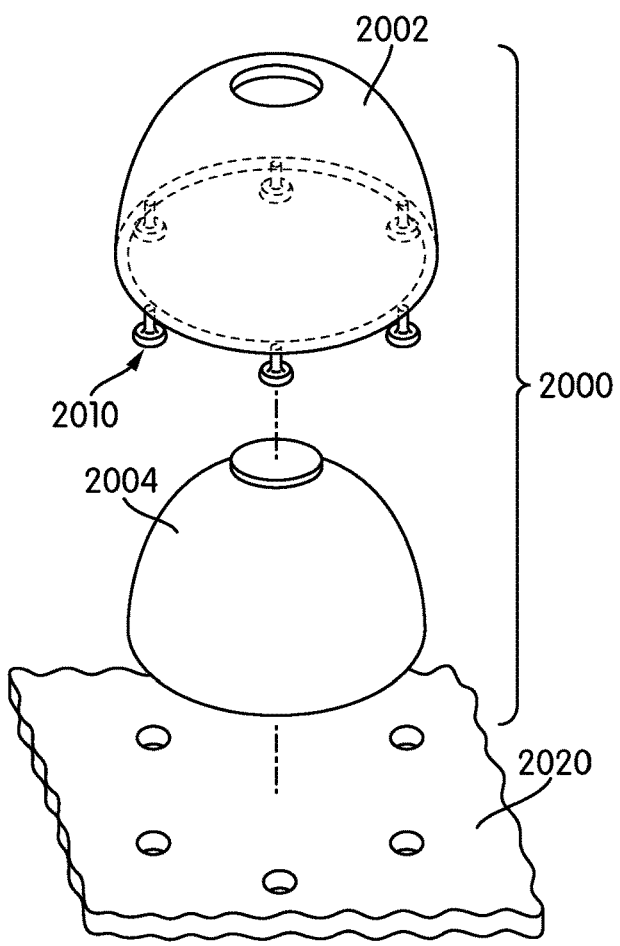
FIG. 41 is a schematic isometric exploded view of an embodiment of a structure with an outer shell portion anchored in a base component.

The configuration shown in FIGS. 40-41 provides a structure 2000 in which outer shell portion 2002 is anchored to base component 2020, while inner portion 2004 is not anchored to base component 2020. Thus, in at least some embodiments, outer shell portion 2002 may act to retain inner portion 2004. In embodiments where inner portion 2004 is comprised of a very soft filler material that might not be suitable for creating anchored portions (e.g., if inner portion 2004 is comprised of a very soft foam), outer shell portion 2002 may ensure that inner portion 2004 stays attached to base component 2020 and within outer shell portion 2002.

Of course in other embodiments, inner portion 2004 could also be configured with one or more anchored portions. Using anchored portions with outer shell portion 2002 and/or inner portion 2004 may reduce the tendency of structure 2000 to pull away or separate form base component 2020, which may be especially useful for materials that are not suitably bond compatible with base component 2020 and/or for configurations where structure 2000 may encounter large forces (e.g., with a ground or other surface) that might tend to stress material bonds between structure 2000 and base component 2020.

Figure 42:
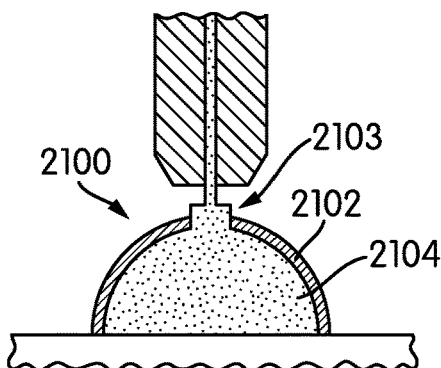
FIGS. 42-43 illustrate schematic views of steps of forming a structure with an outer shell portion and an outwardly extending portion, according to an embodiment.
Figure 43:
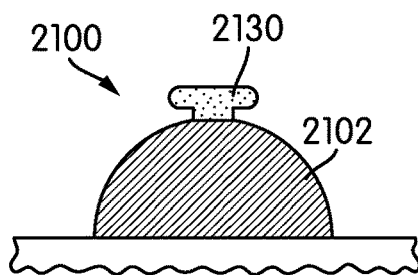

FIGS. 42-43 illustrate an embodiment of a process for forming a structure 2100 with an outer shell portion 2102 and an inner portion 2104. In the embodiment of FIGS. 42-43, inner portion 2104 extends through opening 2103 of outer shell portion 2102 and includes an outwardly directed anchoring portion 2130. Outwardly directed anchoring portion 2130 may be configured to attach to other components including fasteners (such as laces, cords, etc.). As with previous embodiments, outer shell portion 2102 may be formed from a first 3D printing process that provides the necessary precision for achieving a desired geometry for structure 2100, while inner portion 2104 may be formed using a second 3D process that can quickly fill the interior of outer shell portion 2102 and form outwardly directed anchoring portion 2130 via outward spreading of material.

Figure 44:
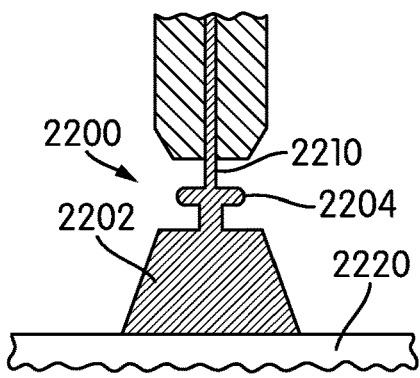
FIGS. 44-46 illustrate a schematic view of steps of forming a cleat member with a base portion made of a first material and a tip portion made of a second material.
Figure 45:
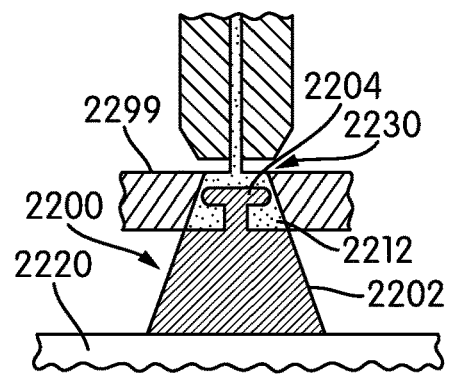
Figure 46:
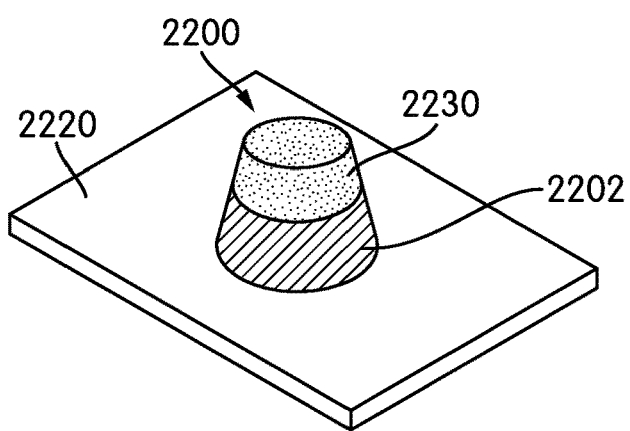

FIGS. 44-46 illustrate an embodiment of a process for forming a cleat structure 2200. In contrast to previous embodiments, the embodiment of FIGS. 44-46 may not use an outer shell portion and an associated inner portion. Instead, as seen in FIG. 44, a base portion 2202 of cleat structure 2200 may be formed by extruding a first material 2210 onto base component 2220. Moreover, an outwardly extending anchoring portion 2204 may be formed on top of base portion 2202. Next, a second material 2212 may be extruded over outwardly extending anchoring portion 2204 in order to form a tip portion 2230 for cleat structure 2200. In at least one embodiment, second material 2212 is a substantially softer material than first material 2210 comprising base portion 2202, thereby providing improved flexibility for gripping surfaces at tip portion 2030. In some embodiments, an optional molding member 2299 may be used to help define the geometry of tip portion 2230 as second material 2212 is extruded or otherwise disposed over base portion 2202.

In at least some embodiments, rather than forming tip portion 2030 via 3D printing, tip portion 2030 could be formed by another process and later assembled over extending anchoring portion 2204. For example, tip portion 2030 could be a pre-formed cap that is manually placed over (e.g., assembled with) extending anchoring portion 2204. This manual assembly could be achieved if tip portion 2030 is substantially flexible (e.g., made of rubber).

Figure 47:
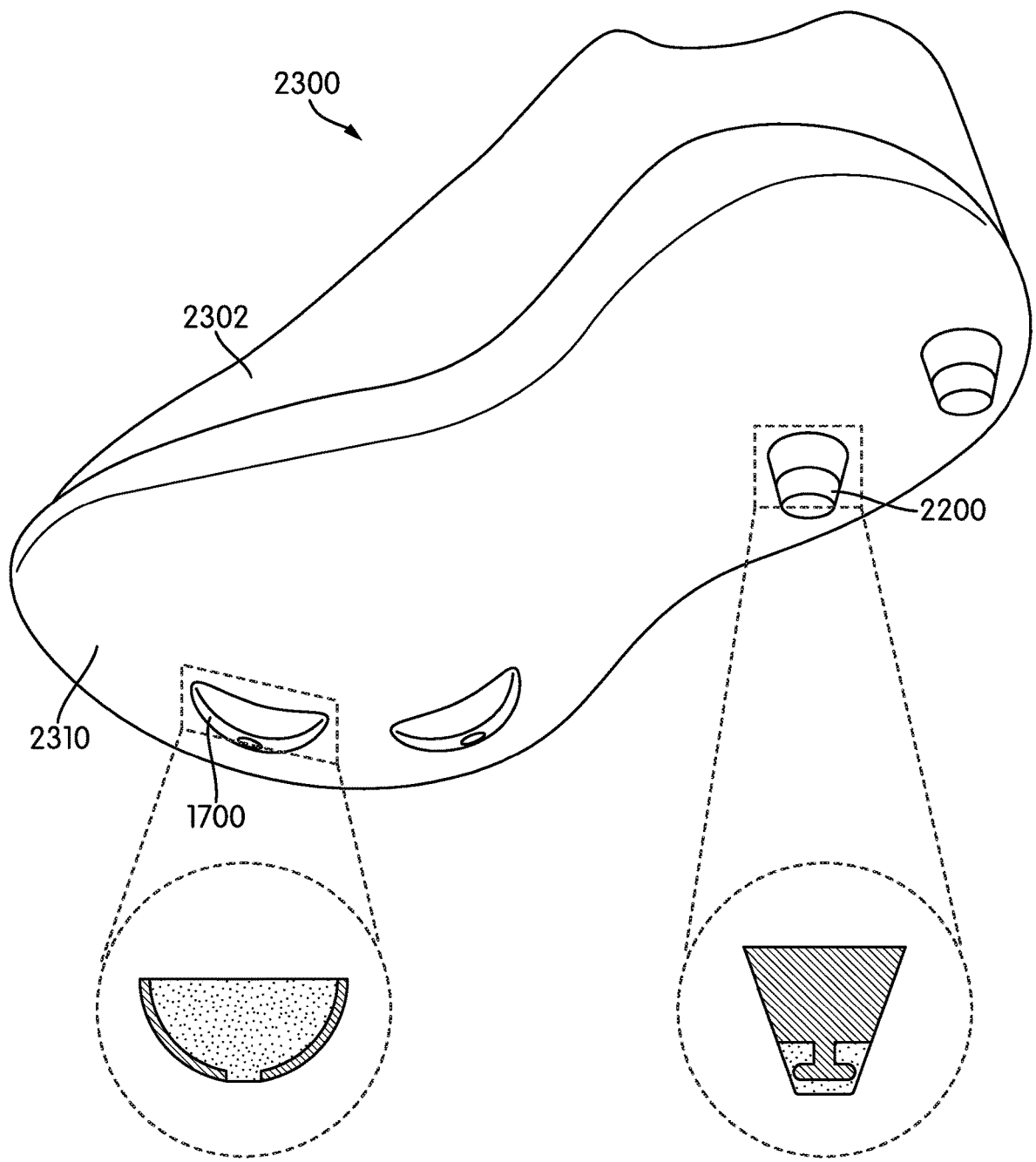
FIG. 47 is a schematic isometric view of an embodiment of an article of footwear with a plurality of cleat members.

FIG. 47 illustrates a schematic bottom isometric view of an embodiment of an article of footwear 2300, including an upper 2302 and a sole structure 2310. Referring to FIG. 47, article 2300 includes a plurality of cleat structures, including cleat structure 1700 and cleat structure 2200.

Figure 48:
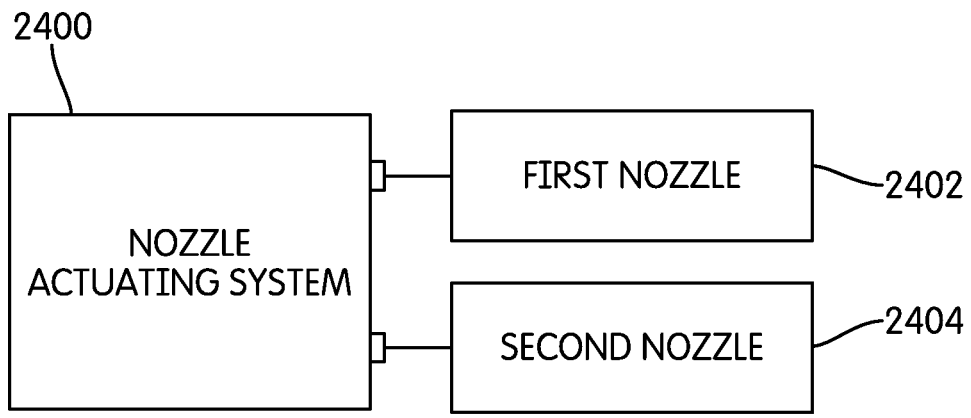
FIG. 48 is a schematic diagram of a nozzle control system including a first nozzle and a second nozzle.

FIG. 48 is a schematic view of an embodiment of a nozzle control system 2400, which may be used to operate a first nozzle 2402 and a second nozzle 2404 in an independent manner. Specifically, in at least some embodiments, first nozzle 2402 and second nozzle 2404 may be actuated to move independently of one another. In embodiments where two distinct printing materials are used, or where it is desirable to have nozzles of different aperture diameters, first nozzle 2402 and second nozzle 2404 may be used to form different portions of a structure. For example, in some embodiments, first nozzle 2402 could be used to form the outer shell portion of a structure, while second nozzle 2404 could be used to form an inner portion of a structure. Likewise, in some other embodiments, first nozzle 2402 could be used to form a base portion of a structure, while second nozzle 2404 could be used to form a top portion of the structure.

Figure 49:
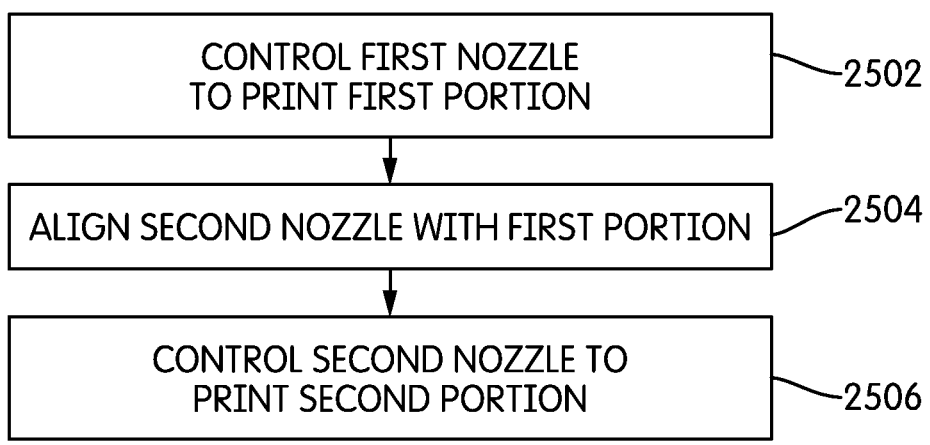
FIG. 49 is an embodiment of a process for forming a structure with a first nozzle and a second nozzle.

FIG. 49 is a schematic view of an embodiment of a process for controlling at least two nozzles that may move and print material independently of one another. In some embodiments, one or more of the following steps could be accomplished by nozzle control system 2400. In other embodiments, however, one or more other systems could perform one or more of the steps. Still further, in other embodiments some of these steps could be optional.

In step 2502, nozzle control system 2400 may control first nozzle 2402 to print a first portion of a structure. In some cases, the printing could be done by extruding the first material. Next, in a step 2504, nozzle control system 2400 may align second nozzle 2404 with the first portion of the structure formed using first nozzle 2402. In step 2506, nozzle control system 2400 may control second nozzle 2504 to print a second portion of the structure. In some cases, the printing could be done by extruding the second material.

It is contemplated that embodiments could use various methods for aligning, or registering, second nozzle 2404 with a formed first portion of material. Due to slight variations in the formed first portion due to tolerances in the precision of many kinds of 3D printing processes, openings or other features in the first portion to which second nozzle 2404 must be aligned, could vary slightly in their locations and/or geometries. In at least some embodiments, therefore, sensors could be used to locate the first portion and/or particular features of the first portion for alignment with second nozzle 2404. For example, in one embodiment, an optical sensing device associated with second nozzle 2404 can be used to determine the location of an opening or other feature on a formed first portion, using algorithms known in the art for detecting visual features in image information. Thus, second nozzle 2404 may be aligned using feedback from the optical sensing device. In other embodiments, any other alignment and/or registration provisions or features could be used to ensure that second nozzle 2404 is properly aligned with first portion before the second portion is printed with second nozzle 2404.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

We claim:

1. A method of manufacturing a structure for permanent attachment to a base component, comprising:
   aligning a first nozzle with an opening in the base component, the first nozzle being located adjacent to a first side of the base component;
   forming an anchored portion on a second side of the base component, including extruding a first material from the first nozzle through the opening and into a molding component on the second side;
   extruding the first material from the first nozzle on the first side to form an outer shell portion of the structure, wherein the outer shell portion is integrally formed with the anchored portion and wherein the outer shell portion includes an upper opening; and
   forming an inner portion of the structure, including filling an interior of the outer shell portion by extruding a second material through a second nozzle and into the upper opening of the outer shell portion.

2. The method according to claim 1, wherein the method includes forming a portion of the structure extending outside of the outer shell portion, wherein the portion of the structure is formed from the second material.

3. The method according to claim 1, wherein the method includes forming more than one anchored portion on the second side of the base component, wherein the outer shell portion is integrally formed with each of the anchored portions.

4. The method according to claim 1, wherein the outer shell portion helps to keep the inner portion in place on the base component.

5. The method according to claim 1, wherein the outer shell portion is cured before the second material is extruded into the interior of the outer shell portion.

6. The method according to claim 1, wherein the first material has a first rigidity when the outer shell portion is cured and wherein the second material has a second rigidity when the inner portion is cured, wherein the second rigidity is greater than the first rigidity.

7. The method according to claim 1, wherein the first material has a first rigidity when the outer shell portion is cured and wherein the second material has a second rigidity when the inner portion is cured, wherein the second rigidity is less than the first rigidity.

8. The method according to claim 6, wherein the first material is rubber and the second material is a plastic material.

9. The method according to claim 7, wherein the first material is a plastic material and the second material is a foam material.

10. The method according to claim 1, wherein the first material and the second material are the same material.

* * * * *